INVENTOR
O. H. WILLIFORD
BY
Howard R. Popper
ATTORNEY

INVENTOR
O. H. WILLIFORD
BY Howard R. Popper
ATTORNEY

Nov. 2, 1965   O. H. WILLIFORD   3,215,784
MULTICUSTOMER PRIVATE BRANCH EXCHANGE
Filed Dec. 22, 1961   10 Sheets-Sheet 8

INVENTOR
O. H. WILLIFORD
BY Howard R Popper
ATTORNEY

INVENTOR
O. H. WILLIFORD
BY Howard R. Popper
ATTORNEY

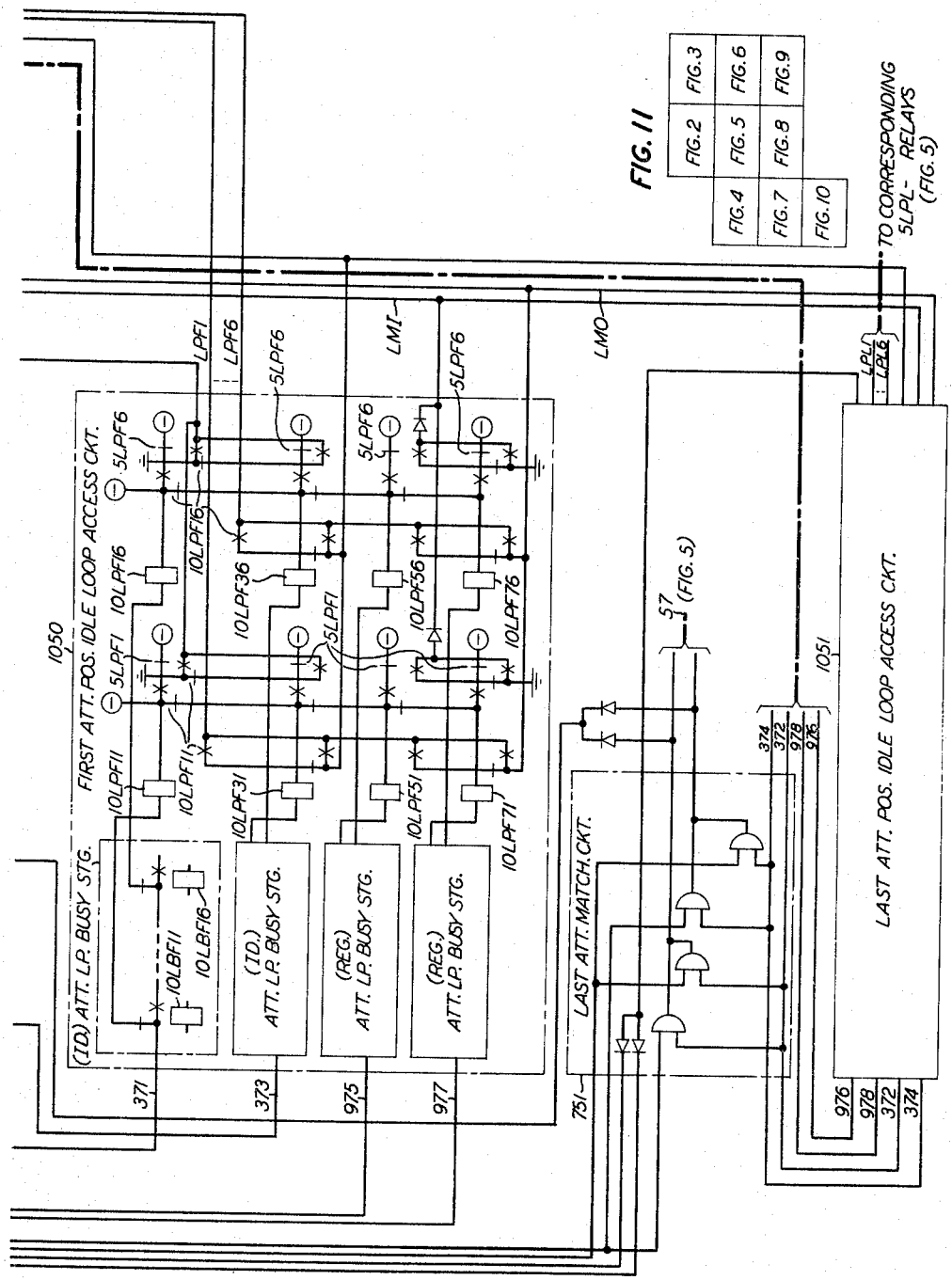

United States Patent Office 3,215,784
Patented Nov. 2, 1965

3,215,784
MULTICUSTOMER PRIVATE BRANCH EXCHANGE
Oscar H. Williford, Bronxville, N.Y., assignor to Bell
Telephone Laboratories, Incorporated, New York, N.Y.,
a corporation of New York
Filed Dec. 22, 1961, Ser. No. 161,612
26 Claims. (Cl. 179—27)

This invention relates to automatic telephone systems and more particularly to a multicustomer private branch telephone exchange.

In the copending applications of O. H. Williford and V. J. Matthews, respectively, bearing Serial No. 135,913 and Serial No. 135,914 and filed on September 5, 1961, now Patents 3,180,941 and 3,180,942, issued April 27, 1965, a multicustomer private branch exchange is disclosed by means of which a number of different telephone customers, each requiring telephone service of a PBX nature, are furnished this service through a centralized switching system advantageously located in or close to the office buildings housing the customers' business establishments. In these versions of the multicustomer private branch exchange concept each telephone customer desiring PBX service must be supplied with his own group of trunks from the central office. These trunks may not be used by any other telephone customer and, accordingly, it is conceivable that while calls to one customer are overflowing because all his assigned trunks are busy, the trunks assigned to another customer may be underutilized. Under usual conditions, i.e., where no customer is expected to use all his trunks all the time, a more efficient arrangement is obtained when all of the trunks between the central office and a multicustomer private branch exchange may be shared by any of the PBX customers.

It was an aspect of the multicustomer private branch exchange concept, as disclosed in the aforementioned two applications, that the task of the "PBX operator" for each customer be simplified to the point where her functional title might more aptly be redesignated to that of "PBX attendant." One of the simplifications obtained was in the attendant-console apparatus in which neither the incoming trunks nor the extension stations were given permanent appearances before the attendant but were enabled to be controlled, when required, by one of a few releaseable LOOP keys at the console. In this manner the amount of cabling required to be brought to the attendants' consoles was reduced hereby permitting them to be remotely located from the centralized switching equipment as well as making possible the streamlining of the apparatus displayed before the attendant. Although the aforementioned simplifications are desirable and lead to the more rapid accomplishment of attendant-completed calls, a certain amount of residual delay in call completion is encountered whenever the inward switching train, comprising the usual selectors and connectors, is reoperated by the attendant to connect the incoming trunk to the line terminals of the desired extension. Because the extensions have no permanent appearances at the attendants' position, the attendant has no means of apprising herself as to the busy or idle state of the desired extension until the switching train has switched through. At that time, the connector of the switching train either initiates the return of busy tone, flash, or other supervisory indications to the attendant, or it initiates the application of ringing to the terminals of the called extension and the return appropriate indications to the attendant. The conventional interrupted ringing supply brought into operation by the connector utilizes a four-second cycle including one second of ringing and three seconds of silence. Accordingly, a three-second delay is possible before the call can be answered by the extension user.

In the foregoing applications, showing inward dialing to PBX extensions, as well as in the copending application of P. H. Arnold et al., Serial No. 72,346 filed November 29, 1960, now Patent 3,175,044, issued March 23, 1965, the talking battery for the called extension is supplied by the connector of the inward switching train whereas the talking battery for that extension when making an outgoing central office call is supplied by the central office. This arrangement introduces a contrast in transmission between calls incoming to an extension from a central office and those initiated by an extension and outgoing through a central office. Calls initiated by an extension will tend to be clearer than those completed to that extension because the extension telephone's loop impedance compensator adjusts itself for "short loop" operation in response to connector talking battery even though the loop length that is involved is the considerably greater one existing between the extension and the central office. The resultant incorrect loop compensation undesirably attenuates transmission on inward-dialed calls. It is extremely desirable to minimize this transmission contrast and to thereby make more efficient utilization of the equipment simplifications and economies made possible by the multicustomer private branch exchange concept.

Accordingly, it is an object of the present invention to provide a multicustomer private branch exchange having multicustomer sharing of central office trunks.

It is an object of the present invention to provide a high-speed inward-switching private branch exchange system.

It is another object of the present invention to provide immediate ringing to and busy supervision of the extension stations of a PBX.

It is still another object of the present invention to provide dial transfer or attendant transfer of incoming calls as desired by the PBX customers of their various extensions served by the multicustomer exchange.

It is another object of the present invention to provide attendant intercept of busy extensions.

It is still another object of the present invention to provide a multicustomer private branch exchange having high speed inward-switching which is compatible with the identified outward dialing apparatus disclosed in the copending application of O. H. Williford, Serial No. 76,352, filed December 16, 1960, now Patent 3,062,918, issued November 6, 1962.

It is a further object of the present invention to provide a multicustomer telephone system which is readily and economically expandable to meet increased telephone traffic.

It is a still further object of the present invention to provide a multicustomer, inward-switching private branch exchange adapted to receive extension station identification digits in a variety of signaling languages.

According to an aspect of the present invention, conventional private branch exchanges may be modernized to provide multicustomer operation, direct inward dialing, response to a variety of digit signaling languages, immediate busy test and attendant intercept of called extension stations, flexible number assignment, cordless attendant switched-in loop operation, and freedom from transmission contrast by supplementing the local switching trains of the various PBX telephone customers with a centralized, end-marking switching system controlled via high-speed link access to register-associated line group translators and customer-associated attendant consoles.

In one illustrative embodiment of the present invention, the incoming trunks, the registers for controlling the end-marking responsive switching apparatus, the attendant loops and the extension station ringing apparatus appear on respective verticals of a crossbar switch. The horizontals of the crossbar switch, as controlled by access requesting circuits associated with the equipments on the verticals, establish whatever connections are required among the verticals.

Further, in accordance with the foregoing illustrative embodiment, the plurality of central office trunks incoming to the multicustomer exchange, each of which trunks may be utilized by any of the customers associated with the exchange, appear on multiple terminal banks of a plurality of trunk finder switches and all the extensions served by the multicustomer telephone exchange have appearances on multiple terminal banks of a plurality of line finder switches. The jack circuits of each trunk finder switch are directly coupled to the jack circuits of a respective one of the line finder switches so that a communication path may be effected from any trunk appearing on the bank of a trunk finder to any extension appearing on the bank of a line finder.

The establishment of the aforementioned communication path is directed under the control of a register, temporarily connected to an incoming trunk in the calling condition by a high-speed crossbar link, and a line group translator which decodes the digits entered in the register to obtain access to and to test the condition of the called station's terminals. The register, having determined that the state of the called station's terminals is appropriate, controls an allotted trunk finder-line finder pair to establish the aforementioned communication path between the trunk and the desired extension.

Further, in accordance with this embodiment, the attendant-access and register-access requesting circuits respectively contain means for reoperating whichever horizontal link path was used to connect a trunk with a register and for reoperating whichever horizontal path was used to connect a trunk with an attendant for the respective purposes of including an idle attendant loop and an idle register in the former connection. Accordingly, the number of horizontal link paths required to be used in handling the various types and phases of telephone calls is conserved and maximum interchangeability of horizontal link paths is obtained.

The achievement of efficient multicustomer PBX call transfer and "operator" assistance functions is facilitated in the foregoing illustrative embodiment by providing an extension station "directory" number identifying apparatus which may selectively be called into operation by an incoming central office or attendant trunk under the control of any extension station. The extension station is identified by directory number to activate a plurality of output busses which control the access requesting circuits of the high-speed link to connect either an in-dialing register or an idle attendant loop to the recalling incoming or calling attendant trunk.

When an "organization directory number call' is made, i.e., one where the calling party desires to be connected to the called business organization's telephone attendant in order to learn the station number of the appropriate individual, the directory number digits transmitted from the central office to the multicustomer exchange are entered in the multicustomer exchange's register, as described above, and translated to obtain access to an idle loop of a telephone attendant's console at the premises of the called organization. The attendant answers the call, converses with the calling party and, via the high-speed link, keys an extension number into an available register. The register then proceeds with the call as in the case of a call initially directed to an extension.

The above-mentioned access to an idle loop of an appropriate attendant's position is advantageously obtained without tying-up the register during the interval that the attendant will be conversing with the calling party. When the register determines (by translating the digits of the called number) that an attendant loop is required to be connected with the incoming trunk, the register applies a marking potential to its connection path through the link causing the link memory to store the identity of the link path connecting the incoming trunk with the register. At the same time, the register activates the attendant loop access circuit for the appropriate attendant position to select an idle attendant loop. When the attendant loop access circuit selects a loop it contemporaneously:

(1) Conditions the attendant-register access circuit to prepare to receive and store a link path identity;

(2) Signals the link access circuit to reoperate the link path whose identity was stored in its memory by the register having marked its connection path therethrough.

When the link path has been so reoperated (1) it allows the loop access circuit to control the link to connect the incoming trunk with the selected attendant loop; and (2) stores its identity in the preconditioned memory of the attendant-register access circuit. The register is now freed to serve other calls.

When the attendant is ready to key the number ascertained from her conversation with the calling party, she operates a "START" key at her console to obtain access to an idle register via the attendant-register access circuit which:

(1) selects an idle register, (2) reads out the link path identity stored in its memory, (3) reoperates the ascertained link path, and (4) controls the link to connect the selected idle register into the incoming trunk to attendant loop path established through the link.

If the extension connected to an incoming trunk in either of the above cases flashes his switchhook, the incoming trunk circuit responds to initiate a call transfer sequence which, advantageously, may connect the signaling extension either to the telephone attendant serving his business organization or to a register into which he may directly key the number of the new extension. The choice of attendant or dial transfer is predetermined individually for each extension by cross-connections to the output busses of the extension line identifier called into operation by the incoming trunk in response to the switchhook flashing. For attendant transfer, the line identifier and responding incoming trunk circuit are matched at a link access circuit to activate the high-speed link to connect the responding incoming trunk with an idle loop of the attendant position indicated by the identifier. The attendant, upon answering the "recall," ascertains the number of the new extension and keys the number into an idle register. The idle register is associated with the attendant position by the high-speed link when requested by the attendant and the high-speed link does this, advantageously, by extending the same link path used to associate the incoming trunk with the attendant position, thereby conserving link paths.

For dial transfer, the line identifier selected outputs and the switchhook flash responding incoming trunk circuit are matched at the link access and activate the link to connect the incoming trunk with an idle register in similar fashion to that in which an incoming call is handled initially.

On dial "0" calls the normal originating switching train available to and used by the calling extension reaches an attendant or dail "0" trunk which appears on a vertcial of the high-speed link in much the same fashion as an incoming trunk. The dial "0" trunk however immediately initiates the extension identification sequence rather than waiting for the switchhook flashing as an incoming trunk would. In response to the identification, the link access circuit controls the link to connect the dial "0" trunk with an attendant appropriate to the calling extension. Thereafter the attendant may perform operations substantially similar to those performed in connection with a call arriving over any of the incoming trunks, and in addition, may perform the usual dial "0" function such dialing outward to a central office, etc.

Accordingly, a feature of the present invention is a branch telephone exchange system which serves a plurality of different telephone customers' organizations by associating, with any of a plurality of central office trunks, any of a plurality of registers, translators, inward switching paths, etc., but which associates with any such trunk during a call to an extension only a specific attendant or specific group of attendants as ascertained by the identity of the organization called.

A feature of the present invention is the apparatus for establishing a "connectorless" communications switching path between any of a plurality of common central office trunks and any of a plurality of PBX extensions assigned to different PBX telephone customers.

Another feature of the present invention is means for establishing communications paths between trunks and lines without the transmission contrast and ringing delays introduced by connectors. In accordance with this feature, the line end of the path is first examined by decoding the line number transmitted by the trunk. The trunk and line ends are then marked if the line is in condition to receive the call, and switching means responsive to the end marking connects the calling trunk with the desired line.

A feature of this invention is a high-speed link apparatus for marking the ends of a communications switching path to be established.

A feature of this invention is a high-speed link apparatus for associating with a communications switching means, means for marking the ends of a communications path and for summoning into a communications path, selectively, apparatus peculiar to the particular path as well as apparatus common to any of the paths establishable through the switching means.

A feature of this invention is a high-speed link for associating a particular telephone attendant with a particular communications switching path independently of the central office trunk over which the path is established, originated or continued.

A feature of the present invention is a high-speed link for associating a particular telephone attendant with a central office trunk and for extending the association to apparatus common to any of the communications paths directable from said trunk without utilizing additional link capacity.

A further feature of the present invention is a multi-customer telephone system having a crossbar switching apparatus all of whose connecting capacity is available for making connections among any of a plurality of different types of circuits, each of which connections has its own variable rate or frequency of usage.

In accordance with this feature, the capacity of the switching apparatus may readily be expanded, when indicated by the increased usage rate of any or all the connections, merely by adding additional switches of the same type without regard to the special characteristics of the particular connection or connections whose usage rates have become excessive.

A feature of this invention is a high-speed crossbar link apparatus which is enabled to remember any link path established therethrough.

Another feature of the present invention is means for selectively reoperating a remembered link path at times required in furnishing PBX service to any of a plurality of different telephone customers.

The foregoing and other objects and features may become more apparent by referring now to the following detailed description and drawing, in which:

FIG. 10 shows the attendant loop access requesting circuits; and

FIG. 11 is a key diagram showing how FIGS. 2–10 should be connected together.

TABLE OF CONTENTS

I. General Description of Block Diagram
 A. Overall System
 B. Direct In-Dialed Call
 C. Central Office Call Incoming to PBX Customer's "Switchboard Operator"
 D. Call Transfer II. General Description of FIGS. 2–10
 A. Central Office Call Incoming to Extension
 B. Central Office Call to PBX Customer's Attendant
 C. Call Transfer Via Appropriate Attendant
 D. Dial Transfer of an Incoming Call
 E. Dial "0" Calls III. Detailed Description
 A. Trunk Circuits and End-Marking Responsive Switching Circuits—FIG. 2
 B. Switching Train Systems and Line Circuits—FIG. 3
 C. Incoming Trunks' Register-Access Requesting Circuits—FIG. 4
 D. Crossbar Link Circuits—FIG. 5
 E. Line Group Translators—FIG. 6
 F. Attendant-Register Access Circuits—FIG. 7
 G. Attendant Consoles—FIG. 8
 H. Registers—FIG. 9
 I. Attendant Loop Access Requestinig Circuits—FIG. 10

I. GENERAL DESCRIPTION OF BLOCK DIAGRAM

A. *Overall System*

Figure 1:
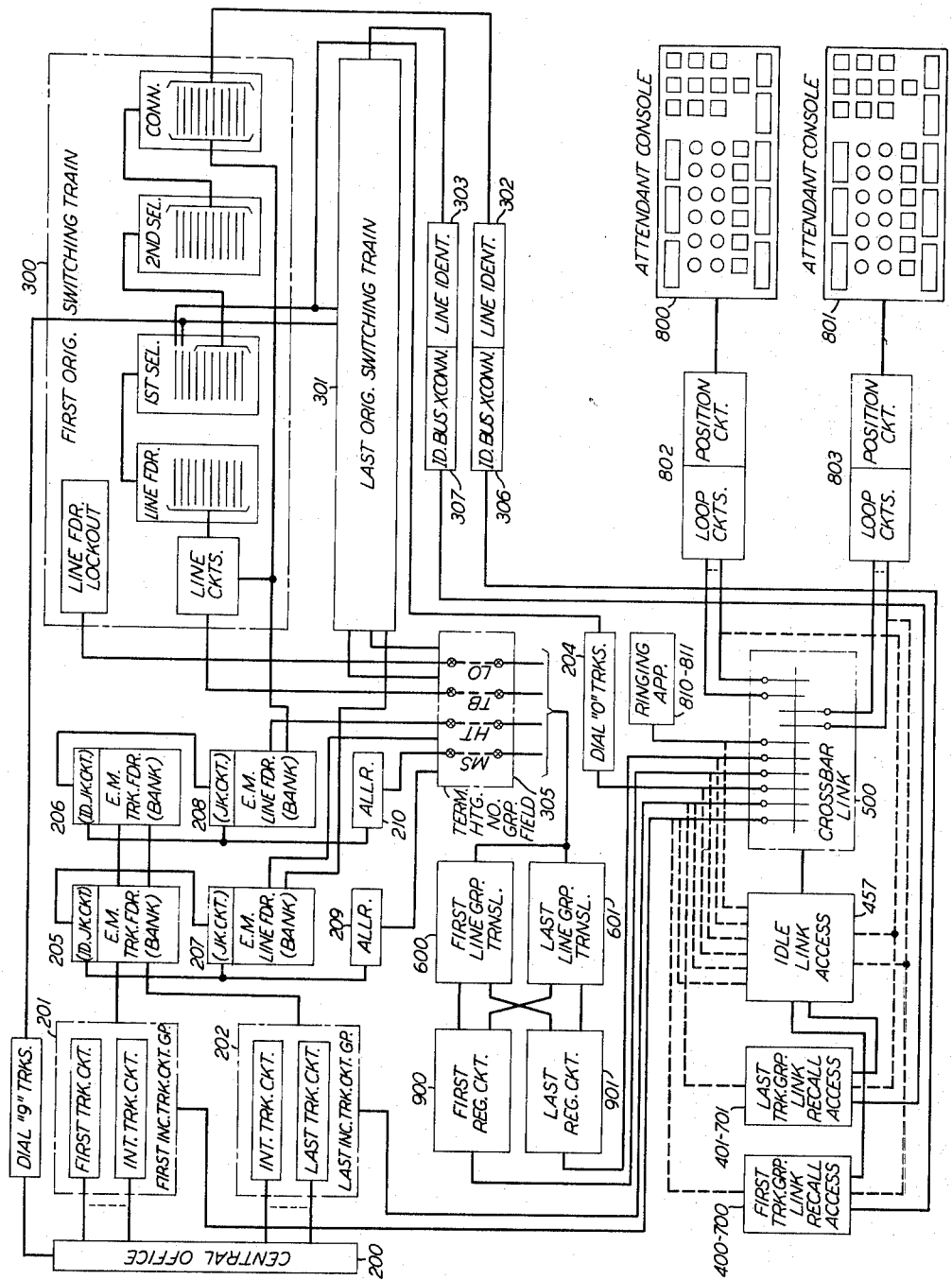
FIG. 1 shows a block diagram of the multicustomer private branch exchange system of the present invention.

The block diagram of the multicustomer private branch exchange system of the present invention shows the system in relation both to a central office 200 and to a group of originating (intercommunication) switching system trains 300, 301 belonging to different telephone customers. (For convenience the first digit of each reference number refers to the principal succeeding figure or figures in which the details of the apparatus outlined in FIG. 1 are shown.) Originating switching system trains 300, 301 may take the form of any well-known type of PBX such as the 701-type manufactured by the Western Electric Company and described, inter alia, in the Bell Laboratories Record of September 1929 at page 36. These PBX systems, if presently installed, advantageously may be allowed to continue to perform many of their usual local (intracommunicating) automatic switching functions as well as their outgoing automatic switching functions (dial "9") to central office 200. For example, the switching trains 300 and 301 may, at the present time, each physically be located on the respective premises of different telephone customers, or, on the other hand, they may be centrally located, for example, in the basement of an office building housing the several PBX, telephone customer-tenants, as discussed in the above-mentioned Patents 3,180,941 and 3,180,942 of O. H. Williford and V. J. Matthews, respectively.

When switching system trains 300, 301 are located on different customers' premises, each would normally serve only one customer's extensions. When centrally-located, each of switching system trains 300 and 301 may, in accordance with the principles of the present invention, be permitted to serve extensions belonging to different customers. In either event, the present invention provides for augmenting switching system trains 300, 301 with centralized equipment for furnishing the extensions of all of the different customers with inward dialing PBX service. For purposes of simplicity therefore, let it be assumed that switching trains 300 and 301 are centrally located as discussed above and that they, accordingly, both may advantageously be served by a common main distributing frame (not shown).

In addition to the conventional equipage, each of the intracommunicating PBX switching system trains 300 and 301 is provided with a respective station line directory number identifying apparatus 302, 303, described in the above-mentioned Patent 3,062,918 of O. H. Williford, and a line finder lockout to be hereinafter more fully described.

PBX switching systems 300 and 301 function in their customary manner when calls are made from one to another of their respective extension stations, and when calls are made from their extension stations via the dial "9" trunks and the central office 200 to other customers' telephones. The remaining apparatus of FIG. 1 is employed in conjunction with switching systems 300 and 301 to provide PBX service on calls incoming from central office 200 to the several extension stations (both automatically and semiautomatically) and on calls arriving over dial "0" trunks 204 from extensions individual to the respective customers served by switching systems 300 and 301.

When a call is incoming from central office 200, the calling party directly dials the telephone directory number of the desired extension station (if he knows what it is), or else he dials the listed directory number of the business organization and talks to a "switchboard operator" who will be able to complete his call to an appropriate extension. In actuality, the "switchboard operator" is, in accordance with the invention, furnished one of the simple console-type telephone sets 800, 801 which merely has keys, lamps and a headset while the "switchboard" switching is accomplished by centrally-located common equipment.

In response to either of the aforementioned numbers being dialed by a calling telephone (not shown), central office 200 selects an idle trunk circuit in one of the plurality of trunk circuit groups 201, 202 incoming to the multicustomer exchange. Each incoming central office trunk circuit, as well as each of the dial "0" trunks 204, has multiple appearances on the banks of end-marking trunk finders 205, 206 as well as an appearance on a vertical of crossbar link 500. The incoming trunk circuit 201 or 202, when seized by central office 200, signals the link access circuit 457 (later shown detailed in FIGS. 4, 5, 7 and 10) to connect an idle one of register circuits 900, 901 to receive the number transmitted by central office 200. The assigned register 900 or 901 decodes the TH and H digits of the directory number either to select the one of line group translators 600, 601 appropriate to the decoded digits (direct in-dialed call), or to activate link access 457 to select the corresponding telephone customer's attendant (call to PBX customer's "switchboard operator").

B. *Direct in-dialed call*

Line group translators 600 and 601, which are seized by the registers having decoded an extension number, may advantageously take the form of the 100 point, 6-wire crossbar switches as described in F. M. Pearsall, Jr. Patent 2,889,402, June 2, 1959. Each of the crosspoints corresponds to a distinctive combination of the TN and U digits of the number transmitted by the central office 200 to register 900, 901. For example, the horizontal magnets of translators 600, 601 may be operated in accordance with the transmitted and registered U digit and the vertical magnets may be operated in accordance with the transmitted and registered TN digit, so that each of translators 600 and 601 will serve a respective group of 100 extension stations.

When a particular crosspoint is selected, a four-wire path is completed over the translator contacts between terminal hunting number group field 305 and register 900, 901. One of the four wires thus selected (the TB lead of FIGS. 3, 6 and 9) is associated with the sleeve terminal of the called extension of switching train 300 or 301 and will exhibit battery potential when the called extension is idle and will be at ground potential when the called extension is busy. If lead TB is at battery potential the operated register 900, 901 activates the MS, HT and LO leads while if the lead TB is grounded the operated register 900, 901 applies busy tone to the incoming trunk, or, if desired, summons the attendant serving the called organization.

The register may advantageously summon the attendant appropriate to the called-but-busy extension either by applying an identifying potential to the TB lead (which is associated with the sleeve of the called-but-busy extension line circuit) or, if the extension and attendant directory number are in the same group, by retranslating the registered number to activate the same code lead for the desired attendant as would initially have been activated had that attendant's number originally been transmitted by central office 200.

Let it be assumed however that the called extension is idle: Every extension station associated with switching system trains 300 and 301 is given a multiple line terminal appearance on the banks of end-marking line finders 207 or 208. When leads MS, LO and HT are activated by register 900 or 901, the appearances of the extension station, whose TN and U digits have operated a crosspoint of line group translator 600 or 601, are marked on the banks of the appropriate one of line finders 207, 208. The energized MS lead activates the appropriate allotter 209 or 210 to select an idle trunk finder-line finder pair such as 205–207 (or 206–208) and causes them to hunt for and to establish a communication path between the terminals of the marked incoming calling trunk and those of the desired extension line. When the selected trunk finder-line finder pair has cut through, the register 900 or 901 causes link 500 to connect an idle ringing apparatus 810, 811 to apply immediate ringing to the called extension. When the extension answers, ringing is tripped, the ringing apparatus releases itself and register 900 or 901 from the call and restores the link 500 to normal.

C. *C.O. call incoming to PBX customer's "switchboard operator"*

On the other hand, if central office 200 transmits to register 900 or 901 the directory-listed digits of an organization's "switchboard operator" the link 500 is controlled by the register via the link access 457 to connect a loop circuit 802 or 803 of an attendant corresponding to the transmitted digits to the calling trunk. When the attendant loop circuit has been connected to the calling trunk, and the attendant has received sufficient information from the calling party to enable her to determine the number of the appropriate extension, she presses the START key of her console 800 or 801 to seize an idle one of registers 900, 901 and then keys the desired extension number. Registers 900, 901 function in a manner similar to that described above and effect a communications connection between the calling trunk and the desired extension by controlling one of the end-marking trunk finder-line finger pairs 205–207 or 206–208.

D. *Call transfer*

Assuming a communications connection to have been established from an incoming trunk circuit of group 201 or 202 through an available trunk finder-line finder pair 205–207, 206–208 to an extension station associated with switching system train 300 or 301, the call may be transferred to another extension in either of two ways. Since one of the usual attributes of PBX service is that call transferral privileges are permitted among a subscriber-organization's extension stations but not permitted between extension stations belonging to different telephone customers, the incoming trunk circuits of trunk groups 201, and 202 are provided with means for recognizing the initiation of a transfer request by an extension user and for causing the recalling extension to be identified. The selection of the type of call transfer to be made is also accomplished incident to the identification of the recalling extension line. According to one type of service the extension line is reconnected with an available attendant serving his organization exclusively so that the attendant may key only numbers within her organization and so that the recalling extension user may be connected with an attendant sufficiently familiar with his organization as to render intelligent call assistance. This type of call transfer demands that the extension be identified so that only an attendant appropriate to the recalling extension organization may be selected. On the other hand, the recalling extension may be provided with a class of call transfer in accordance with which he is permitted directly to dial the digits of the extension station to which the call is desired to be transferred. This type of service is called dial transfer.

For either type of service, the extension user flashes his switchhook causing a series relay in the incoming trunk circuit to initiate a sequence of operations in which one of link recall access circuits 400–700 or 401–701 returns an enabling signal to the recalling incoming trunk. The trunk circuit continues the enabling signal via the allotter 209, 210 to the jack circuit of the trunk finder 205, 206 involved in the particular communication connection effected by the call and the jack circuit applies an identifying potential toward the sleeve terminal of the recalling extension. The identifying potential finds its way back along the sleeve conductors of the associated line finder 207, 208 to the sleeve terminal of the line circuit belonging to the recalling extension. An identifier 302, 303 is associated with the conventional connector bank of switching train systems 300, 301 in the manner described in the present inventor's Patent 3,062,918, mentioned above. However the conventional connector itself plays no part in the inward switching operations of this invention and only serves to furnish a convenient place to which to connect the identifiers 302, 303. Connections are made to the output busses of the identifiers 302, 303 so that they designate, for example, by means of the TH and H digit busses, the number of the appropriate attendant. The number so designated controls first trunk group recall access circuits 400–700 or last trunk group recall access circuits 401–701, one of which then activates link 500 to connect the recalling trunk with an idle loop of the appropriate attendant.

Some of the advantages of the above system as so far described may now become more apparent. For example, any of incoming trunks of trunk circuit group 201, 202 may be used by the central office 200 in the directing of a call to any of the extension stations of switching system chains 300 and 301 so that there be no need for the assignment of specific trunks or subgroups of trunks to any particular group of extension stations or business organizations served by the multicustomer switching system. The digits of a desired extension transmitted by the central office 200 are first used to determine whether the corresponding extension is in a condition to receive a call before effecting an actual communication switching path between the calling trunk and the extension, thereby materially reducing call handling time as compared to systems which require the extension of the complete communication switching path from the trunk to the extension only to find out that the desired extension is not in condition to receive the call. The control of the communication switching path is, by means of a translator-crosspoint-controlled, terminal-hunting number-group, flexibly associated with the extensions. Terminal hunting according may proceed in an order independent of the "directory" numbers of the extension stations to be sequentially examined. The actual completing of the communication switching path is by means of an end-marking switching apparatus which omits the usual connector found in other communication path switching systems, especially those of the step-by-step variety. Accordingly, talking battery for the extension may be provided from the central office both for calls originated by an extension and outgoing through the central office as well as for calls originated through the central office and incoming to an extension. Ringing is not tied to a "connector," and accordingly, an advanced form of ringing apparatus which bridges the silent interval may be utilized, all of which advantages and modes of operation may be better understood from the ensuing description of FIGS. 2–10.

II. GENERAL DESCRIPTION OF FIGS. 2–10

A. Central office call incoming to extension

A call is directed from central office 200 to any of the extension stations 310, 311, etc. of the switching systems 300, 301 when the central office 200 applies a calling bridge across the T and R trunk circuit leads of one of the incoming trunk circuit groups 201, 202. For the sake of simplicity, the system operation will be described with reference to one trunk circuit of trunk circuit group 201, which group normally includes 20 circuits of the type shown in detail. The calling bridge operates trunk relay 2T10 which initiates a register access request signal to the associated incoming trunk-register access circuit 400 of FIG. 4. The incoming trunk-register access circuit 400 allows one of the 20 trunk circuits at a time to request connection to an idle register. Operated relay 2T10 operates an idle one of the register selection relays 4FR$a$P through 4FR$n$P of access circuit 400 over a path selected by register busy steering circuit 402 to initiate a bid through the link steering-lockout circuit 502 of the high speed link selection circuit 501. Link steering-lockout circuit 502 completes an operating path to an idle horizontal link path selection relay 5FHP0 through 5FHP or 5LPH0 through 5LHP9. When one of the aforementioned horizontal link path selection relays is operated, an enabling signal is returned to access circuit 400. The enabling signal allows access circuit 400 to operate the calling trunk's vertical hold magnet 5IT- and the selected register's vertical hold magnet 5RG$a$, 5RG$n$ in link 500. When the vertical hold magnets of the calling trunk and selected register are operated, the operated horizontal link path selection relay is released and a path is completed by crossbar link 500 for the leads of cable (2–5) to the leads of cable (5–9) if register 900 was selected or to the leads of cable (5–9′) if register 901 was selected by circuit 400.

The selected register is, incident to the operation of register access circuit 400, preconditoned to associate a digit receiver of the type required by the calling trunk and to receive any signals, via the access circuit 400, which the calling trunk may transmit prior to the operation of the crossbar link 500 vertical hold magnets. The register is accordingly enabled to receive step-by-step pulses directly from the central office 200 should the calling central office be of the type which transmits digit signals without waiting for the called end to "answer." The selected register receives in digit receiver 904, 905 the signals which the central office transmits and enters them into the appropriate W, X, Y and Z stages (corresponding respectively to the TH, H, TN and U digits of the extension designations) of the associated called number register 906, 907. The TH and H digits from the W and X stages of the register are translated by register translator 908, 909 to select one of line group translator connectors 902, 903, or to activate one of leads 975 through 978. Assuming however that the call is to an extension station, one of only the former group of leads will be activated and a line group translator connector will be selected.

The selected line group translator connector 902, 903 connects the outputs of the Y and Z stages of the register to operate, respectively, one of the horizontal and one of the vertical magnets of the associated line group translator 600, 601. The operated horizontal and vertical magnets "make" one of the hundred translator crosspoint connections and the "made" crosspoint connects a particular set of TB, HT, MS, LO terminals of terminal hunting number group field 305 to the operated register 900, 901. At the number group field the TB and HT terminals are cross-connected to the line circuit of the called telephone 310, 311 respectively associated with switching system trains 300 and 301.

The line circuit, when idle, applies (cut-off) battery potential, and when busy, applies ground potential to the associated TB lead. The operated register 900, 901 responds to the battery potential (called line idle) to ground the HT and MS leads and also applies positive battery to the S lead of cable (5-9) to operate incoming trunk 201 relay 2TMS via the connection established through link 500. Relay 2TMS operated grounds the "G" lead to allotters 209, 210.

The grounded MS lead selects the one of allotters 209, 210 appropriate to the called extension, and together with the grounded "G" lead from trunk circuit 201, completes an operating path to start the end-marking line finder-trunk finder pair selected by the allotter. The grounded MS lead also enables the allotter to mark the commutator level of the called line on the bank of the selected end-marking line finder. The sleeve terminal appearance of the called (idle) line on the bank of the end-marking line finder 207, 208 is marked by the (cut-off) battery potential appearing on the S1A lead of cable (2-3), (2-3'). Except as indicated by the cable between the banks of end-marking trunk finder 205, 206 the representations of the multiple appearances of the called lines' and incoming trunks' terminals on the banks of the end-marking finders 205-207, 206-208 are, for the sake of simplicity, omitted from the drawing.

When the allotted end-marking trunk finder 205, 206 has found the calling trunk and its companion end-marking line finder 207, 208 has found the marked terminals of the called station, the jack circuits of the allotted paired finders 205-207, 206-208 "cut-through" and complete a communication switching path for the tip, ring and sleeve conductors from the calling trunk circuit of trunk group 201 to the line circuit of the switching train system 300 or 301.

The operated register, prior to requesting that ringing be applied to the called lines' terminals, advantageously determines the completion of the "cut-through" condition by employing a continuity verification circuit 910, 911 of the type shown for example, in A. J. Busch, Patent 2,585,904, February 19, 1952 and discussed therein at column 53, et seq. Described briefly, the continuity verification apparatus 910, 911 applies a 20 cycle signal across the T1 and R1 leads of cable (5-9) of the instant apparatus. In series therewith is a gas tube breakdown circuit (not shown) which is responsive to line impedance. The line impedance is high until the allotted finder pair 205-207 or 206-208 has cut-through to the line circuit of the called station whereupon the low A.C. impedance of the called telephone's ringer triggers the gas tube circuit. In the instant apparatus the breakdown condition of the continuity verifier initiates a bid (lead RSa, NSn grounded) to the ringing control circuit 810, 811. The determination of cut-through may however be obtained with equally advantageous results by employing additional conductors in the communication switching path in accordance with the method disclosed in the aforementioned, Patents 3,180,941 and 3,180,942.

When the finders have "cut-through," continuity verifier 910, 911 in addition to grounding lead RSa, RSn also causes the link 500 to mark the register-to-trunk connection path by applying a marking potential to lead S1 of cable (5-9). The identity of the marked connection path is stored in circuit 501 so that ringing control circuit 810, 811 in response to the bid initiated by continuity verifier 910, 911 will reoperate the marked link path and apply ringing to the appropriate trunk's appearance in the link. The details of ringing control circuit 810, 811 which lead to the operation of the vertical hold magnet 5IR- after the seizure and reoperation of the horizontal link path marked by register 900, 901 involve circuitry essentially analogous to that described later in connection with the operation of the attendant position loop access circuit 1050 and are therefore omitted to preserve the clarity and cogency of the drawing. When the called station 310, 311 answers, ringing control circuit 810, 811 trips ringing and releases its vertical hold magnet from the link.

B. *Central office call to PBX customer's attendant*

When the calling party has "dialed" and central office 200 has transmitted the listed directory number of a business organization served by the multicustomer exchange instead of the number of an extension station served by the multicustomer exchange, the operated register-translator 908, 909 instead of selecting one of line group translator connectors 902, 903 operates the one of leads 975, 976, 977, 978 appropriate to the called customer's attendant. Assuming that regitser 900 has been seized and that the call is to the attendant associated with lead 975 (the "first" attendant), the ground applied to lead 975 is transmitted to attendant loop access circuit 1050 where it operates an idle one of the first attendant position loop selection relays 10LPF51, 10LPF56. The operated 10LPF51, 10LPF56 relay applies operating ground to precondition register-access link path memory circuit 704 for storing a horizontal link path identity. Simultaneously therewith, register translator 908 operates its 9RF relay which is cross-connected to be operated whenever any organization's listed number is decoded. Relay 9RA operated applies marking potential to lead S1 of cable (5-9) to mark the register to trunk connection path through link 500. The S1 lead having the marking potential operates the appropriate one of link memory relays 5LM0-5LM9 of link selection circuit 501. In circuit 1050, the operated loop selection relay 10LPF51-10LPF56 grounds a path prepared by the operated link memory relay 5LM0-5LM9 to reoperate the horizontal link path connecting the trunk and register so that the selected attendant loop may be connected with the incoming trunk and the register released. At this time the reoperated horizontal link path identifies itself to the preconditioned memory 702. The reoperated horizontal select magnet then returns an enabling ground to attendant loop access circuit 1050 which is continued over the operated contact of the 10LPF51, 10LPF56 loop selection relay to the appropriate attendant loop's vertical hold magnet 5LPF1, 5LPF6. Accordingly, a selected loop of the first attendant is connected via link 500 to the calling trunk and register 900 may be released for use on other calls.

The attendant answers the call by depressing the loop key opposite the calling source lamp of her console 800, 801 which console is advantageously of the type described in the above-mentioned Patents 3,180,941 and 3,180,942. When the attendant has ascertained the number of the extension desired by the calling party she depresses the START key of her console 800, 801 to associate an idle one of registers 900, 901. The operation of the START key applies battery to the corresponding 7LR- relay in the first attendant's register access circuit 700. The operated 7LR- relay initiates a bid over register steering circuit 702 in similar manner to that in which the operated 4TP- relay initiated a bid for an idle register over the contacts of register busy steering circuit 402. One of the register selection relays 7FR$a$P, 7FR$n$P is operated and signals the register access link path memory circuit 704 to read-out the link path identity stored incident to the reoperation of the link path by attendant loop access circuit 1050. The identified horizontal link path is again reoperated and returns enabling ground over the operated 7FR$a$P, 7FR$n$P relay contact to operate the selected register's vertical hold magnet 5RG$a$, 5RG$n$.

The attendant may now key the desired number into the selected register which decodes the keyed number and selects one of line group translator connectors 902, 903. The selection thereof initiates a sequence of operations culminating in the establishment of a communications path through one of end-marking trunk finder-line finder pairs 205-207, 206-208 between the calling trunk 201 and the desired extension, whereupon the attendant loop may be released.

As mentioned above, the ringing control apparatus 810, 811 include circuits similar to attendant loop access circuit 1050 and which respond to activation by continuity verifiers 910, 911 to reoperate a horizontal link path and to assign thereto an idle ringing supply in substantially the same manner as circuit 1050 responded to the activation of lead 975 to reoperate the horizontal path and to assign thereto an idle attendant loop.

C. *Call transfer via appropriate attendant*

When a communications switching path has been established via an end-marking trunk finder-line finder pair 205-207, 206-208 the extension station 310, 311 user may, by flashing his switchhook, initiate a sequence of operations to have the call from central office 200 transferred to another extension. The incoming trunk circuit executes its recalling function in response to extension switchhook flashing and reoperates its trunk preference relay 4TP in the incoming trunk register access circuit 400. The access circuit 400, via the incoming trunk of group 201, returns an enabling signal to the same allotter 209, 210 which was associated with the incoming trunk when the communication path was initially established. The allotter 209, 210 operates the 2ID relay in the jack circuit of the end-marking trunk finder 205, 206 included in the communication switching path. The operated 2ID relay applies an identifying signal to the S1 sleeve lead of the switching connection which identifying potential operates the line identifier 302, 303 associated with the recalling extension's switching train system 300, 301. The operated identifier 302, 303 operates as described in the above-mentioned Patent 3,062,918 to mark one each of its thousands, hundreds, tens and units output busses of which only the thousands and hundreds busses, for example, are required to be cross-connected in ID cross-connection circuit 306, 307 to activate the one of leads 371, 372, 373 and 374 appropriate to the attendant associated with the recalling extension.

The activated one of leads 371-374, together with the enabling signal received over a 4AT contact from the incoming trunk register access circuit 400, 401, activates the appropriate attendant matching circuit 750 (for the first attendant), 751 (for the last attendant). Considering that the first attendant matching circuit 750 is so designated by the trunk register access circuit 400 and the lead 371, AND gate 7FTFA is enabled. The enabling of any of the AND gates of first attendant matching circuit 750 results in the application of an enabling ground to the register access link memory 704 and the initiation of a bid over cable 57 to the intermediate link steering-lockout circuit 502 of the link selection circuit 501. The circuit 501 selects an idle link and via OR gate 50R, returns an indication thereof to the first attendant position idle loop access circuit 1050, one of whose loop selection relays 10LPF11, 10LPF16 was operated by the activated lead 371 over attendant loop steering contacts 10LBF11-10LBF12. The idle link indicating signal from circuit 501 is continued over the operated 10LPF11, 10LPF16 contact to operate the vertical hold magnet 5LPF1, 5LPF6 for the loop selected by circuit 1050. An operating ground is continued over another contact of the operated 10LPF11, 10LPF16 relay and one of isolation devices 7DM1, 7DM2 to the incoming trunk register access circuit 400 and extended over the contacts of the operated 4TP- relay to operate the vertical hold magnet 5IT- of the corresponding recalling trunk. Accordingly, an available loop of an attendant appropriate to the recalling, switchhook-flashing extension is connected in the communication switching path between the central office and the recalling trunk by means of which the attendant, in conversation with the extension user, may determine the identity of the extension to which the call is to be transferred.

When the attendant has determined the new number she depresses the start key at her console 800, 801 to cause attendant-register access circuit 700 to associate an idle register 900, 901 with her loop into which register she may key the new number. As before discussed in connection with a call initially routed to an attendant, the register should be associated with the attendant loop via the proper one of the connections established through the link 500. Accordingly, one of the first attendant register access circuits 700 makes use of the register-access link memory 704 to read-out the identity of, and to reoperate the identified horizontal link path so that the register will be connected to the desired attendant. The attendant then keys the new number into the selected register 900, 901 which decodes the keyed number to select an appropriate line group translator 600, 601 and controls end-marking switching train 205-207, 206-208 to connect the trunk circuit to the new extension.

D. *Dial transfer of an incoming call*

In lieu of connecting an appropriate attendant to an extension desiring to transfer an incoming call, the ID bus cross-connection circuit 306, 307 may be arranged, for any of the extensions served by their respective switching train 300, 301, to activate the dial transfer indicating lead DT. The DT lead when activated operates relay 4DT of the incoming trunk register access circuit 400, 401. The operated 4DT relay cancels the attendant transfer indication (relay 4AT operated) normally sent by the incoming trunk-register access circuit to the attendant matching circuit 750, 751, and allows the incoming trunk-register access circuit 400, 401 to operate in much the same manner as it operated on a call initially incoming over trunk circuit group 201. One of the register selection relays 4FR$a$P, 4FR$m$P is operated to activate the link selection circuit 501 which enables circuit 400, 401 to control link 500 to connect an idle one of registers 900, 901 to the recalling trunk circuit 201.

Incident to this operation of trunk register access circuit 400, pulsing class circuit 404 is activated to inform the selected register as to the type of digit receiver 904, 905 required to be associated with the connection for use by the recalling extension. In this manner the registers 900, 901 are made to be compatible with any type of extension stations including those equipped for multifrequency keying such as the type disclosed in L. A. Meacham, Patent No. 2,986,603, May 30, 1961. Thus, even though the incoming trunk over which the call was routed to the recalling extension was from a step-by-step central office and even though the incoming trunk, register-access selection relay 4FR$a$P, 4FR$n$P selects the same one of registers 900, 901 in response to the dial transfer indicated, as was selected by these relays when first signalled by the central office, the pulsing class circuit 404 notifies the selected register 900, 901 to associate a digit receiver appropriate to the type of digit signaling equipment at the extensions.

E. Dial "0" calls

When an extension user wishes for any reason to reach an attendant serving the telephones of his business organization, he dials "0." The originating switching system 300, 301 connects the calling extension in well-known manner to one of the dial "0" (i.e., attendant-seeking) trunks of dial "0" trunk group 204. In response thereto the operated trunk circuit of trunk group circuit 204 immediately applies an identifying potential to the S1 sleeve conductor in similar manner to that in which the ID jack circuit of end-marking trunk finder 205 applied an identifying potential to the S1 sleeve conductor of the common switching path. For the sake of simplicity, neither the details of this circuit nor of the circuits for activating the attendant loop access circuit 1050 are repeated inasmuch as they are substantially identical to those shown in and associated with incoming trunk circuit group 201; i.e., these circuits operate to associate the attendant identified by the activated output leads 371-374 of ID bus cross-connection circuit 306, 307 with the calling dial "0" trunk of circuit 204 in much the same manner as the attendant was associated with the calling incoming trunk circuit 201 and the attendant, once so associated with the dial "0" trunk, controls the switching system of the multi-customer exchange in substantially the same manner.

III. DETAILED DESCRIPTION

A. FIG. 2

Figure 2:
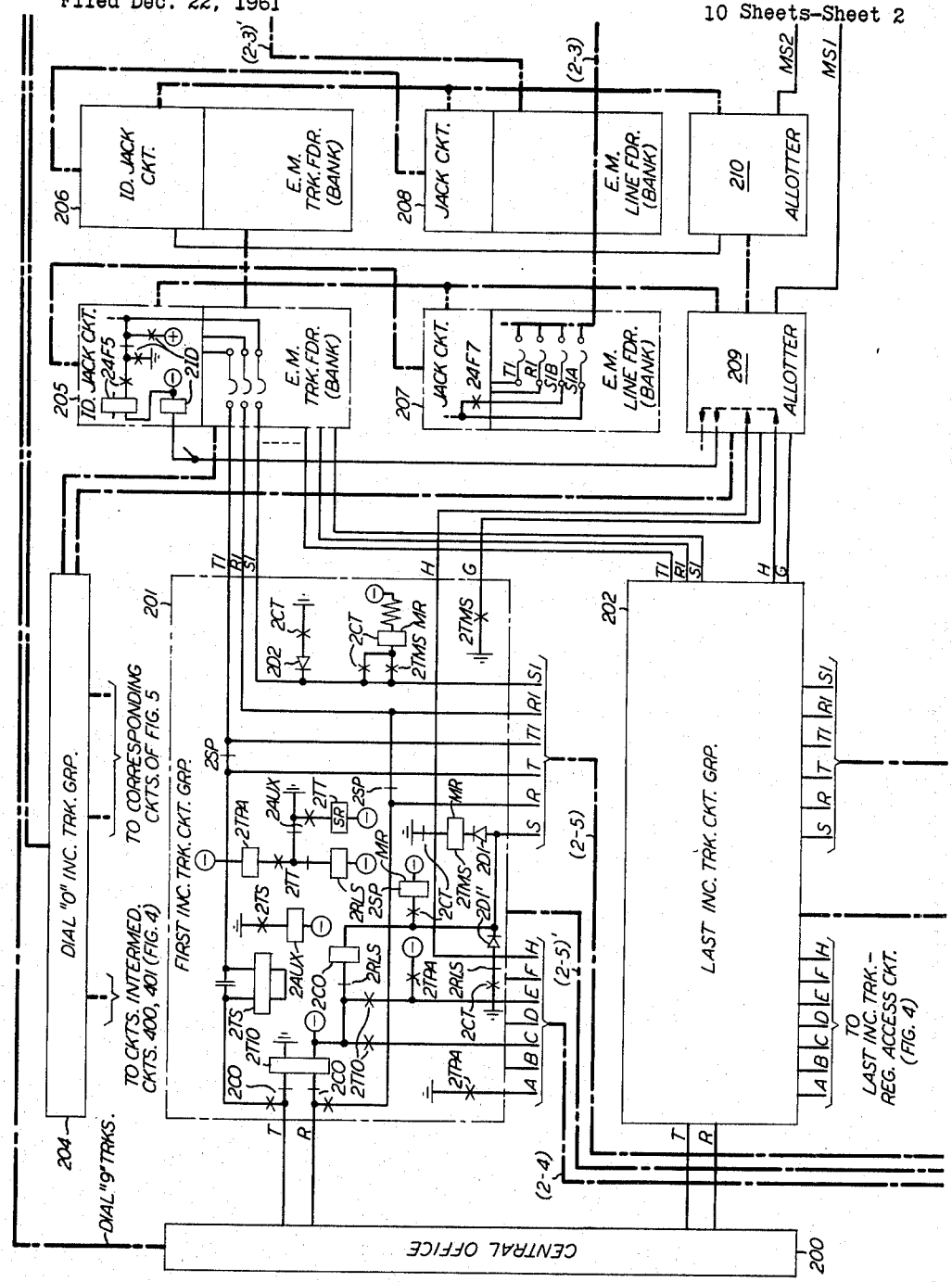
FIG. 2 shows the trunk circuits and end-marking responsive switching circuits.
Figure 9:
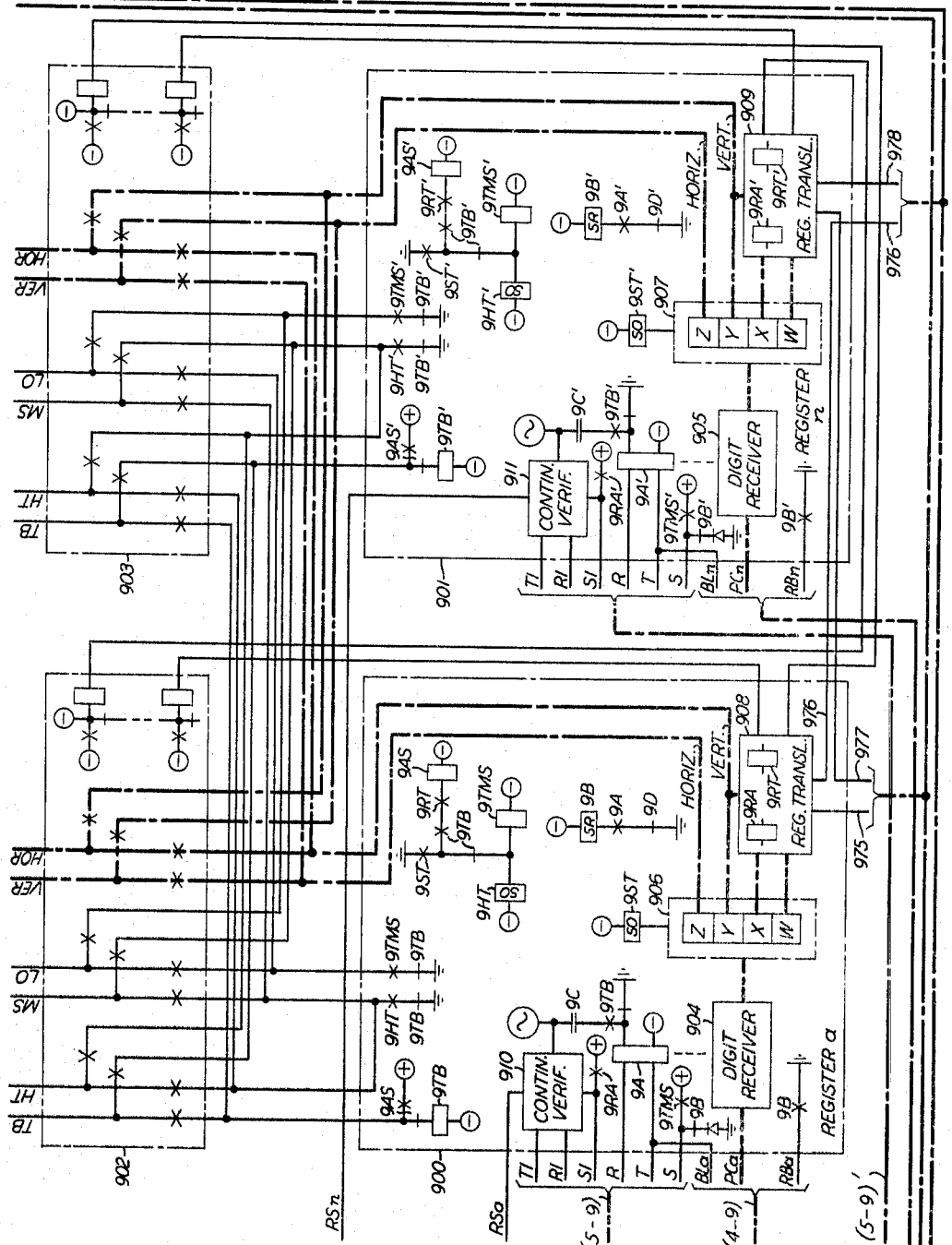
FIG. 9 shows the register and line group translator connectors.

Central office 200 applies calling bridge to the T and R leads incoming to the illustrated trunk circuit of trunk circuit group 201 operating relay 2T10 over back contacts 2C0. Relay 2T10 operated applies battery to lead C of cable (2-4). The application of battery to this lead initiates a sequence of operations involving FIGS. 4, 5, and 9 leading next, so far as FIG. 2 is concerned, to the appearance of ground potential on lead S of cable (2-5). In response to the ground potential on lead S relay 2C0 operates to battery over back contact 2RLS thereby transferring the T and R leads from the winding of relay 2T10 to the T1 and R1 leads of cable (2-5) and to the terminal banks of end-marking trunk finders 205, 206. Battery is applied to the T lead and ground is applied to the R lead of cable (2-5) by the winding of the 9A-relay of the registers 900, 901 (FIG. 9). These potentials are opposite to the battery and ground applied by the windings of relay 2T10, and in response thereto, central office 200 starts transmitting the called digits. The called digits are transmitted through the incoming trunk circuit to the register over the T and R leads of cable (2-5). If, however, central office 200 is of the type which sends step-by-step pulses without waiting for battery and ground reversal, the step-by-step pulses will be repeated to register 900, 901 by relay 2T10 applying pulsing battery to the C lead of cable (2-4) (prior to the operation of relay 2C0). After the operation of relay 2C0 the T and R leads of cable (2-5), via link 500, convey the pulses to register 900, 901.

When the register 900, 901 has decoded the signals, positive battery potential is applied to the S lead of cable (2-5) which operates marginal relay 2TMS to ground over back contact 2CT in series with diode 2D1. Relay 2TMS operated applies resistance battery in series with the winding of relay 2CT to the S1 lead connected to the trunk's terminal appearances on the terminal banks of end-marking trunk finders 205, 206. Relay 2TMS operated also activates allotters 209 and 210 by grounding lead G. When the MS1 lead or MS2 lead is thereafter grounded (by number group 305, FIG. 3) the associated allotter selects and starts an idle end-marking trunk finder-line finder pair 205-207, 206-208. The bank terminal appearances of the desired extension, on the other hand, is marked from FIG. 3 by resistance battery applied to the appropriate S1A lead of cable (2-3), (2-3)' connected, respectively, to the banks of end-marking line finders 207, 208. When the allotted pair of finders have found the marked S1 and S1A terminals their respective jack circuit "4F" relays 24F5 and 24F7 "cut-through" and establish a communication path for the T1 and R1 conductors of trunk circuit 201 to the T1 and R1 conductors of the appropriate line circuit. Details of the "4F" relay circuits are shown in the above-mentioned Patents 3,180,941 and 3,180,942, and are accordingly not repeated herein. However, in addition to the contacts of the "4F" relays shown in the above-mentioned copending applications, an additional jack circuit contact 24F7 is provided in the end-marking line finders to connect the S1A lead to the S1B lead at "cut-through." The ground applied in FIG. 3 to the S1B lead of cable (2-3), (2-3)' is continued over the operated 24F7 contact to the S1A lead of the line circuit associated with cable (2-3), (2-3)' as well as the S1 lead of the detailed trunk circuit of trunk group 201. Marginal relay 2CT operates in response to the ground appearing on the S1 lead and locks to lead S1 in series with diode 2D2. Relay 2CT operated completes a locking ground for relay 2C0 over back contact 2RLS and diode 2D1'. A communications switching path is accordingly extended from the detailed trunk circuit 201 to the called line and this communication path is supervised by series relay 2TS.

The supervisory operation functions as follows: Relay 2TS releases in response to on-hook signals during switch-hook flashing by a subscriber connected to the T1 and R1 leads of the detailed trunk circuit of trunk circuit group 201. Relay 2TS released opens the operating path for relay 2AUX. Relay 2AUX released opens the operating path for slow release relay 2TT which will completely release only if the on-hook condition persists long enough to indicate disconnect. The contacts of relay 2AUX released, and the contacts of relay 2TT not yet released, complete an operating path for relay 2PA which operates, applying ground to the A lead of cable (2-4) and battery to the E lead of cable (2-4). The foregoing battery and ground initiate a sequence of operations resulting in a reoperation of the trunk circuit 201 relays essentially the same as that described above in connection with an incoming call.

In addition to the foregoing operation and reoperation of the above-described trunk circuit 201, splitting relay 2SP may be operated by an attendant loop connected to cable (2-5) by link 500, if the attendant desires to split the communication path so that she may converse separately with the party calling via the central office and the called or recalling extension user. Relay 2SP is operated by positive battery applied by the attendant loop to the S lead of cable (2-5) over the path prepared by the operated make contact of relay 2CT. Diode 2D1' blocks the positive battery from being shorted to ground through contacts 2CT and 2ALS.

Figure 4:
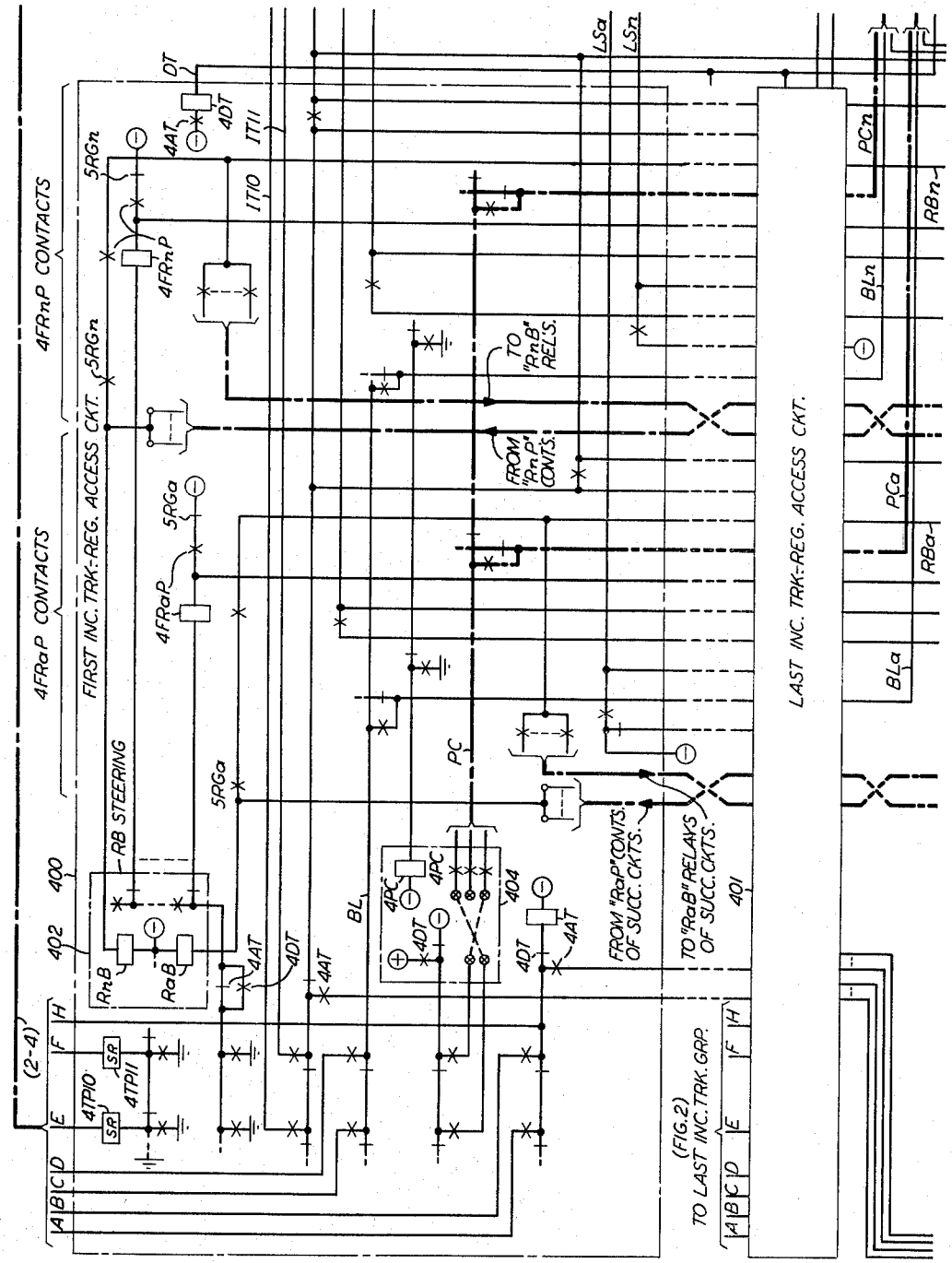
FIG. 4 shows the incoming trunks' register-access requesting circuits.
Figure 5:
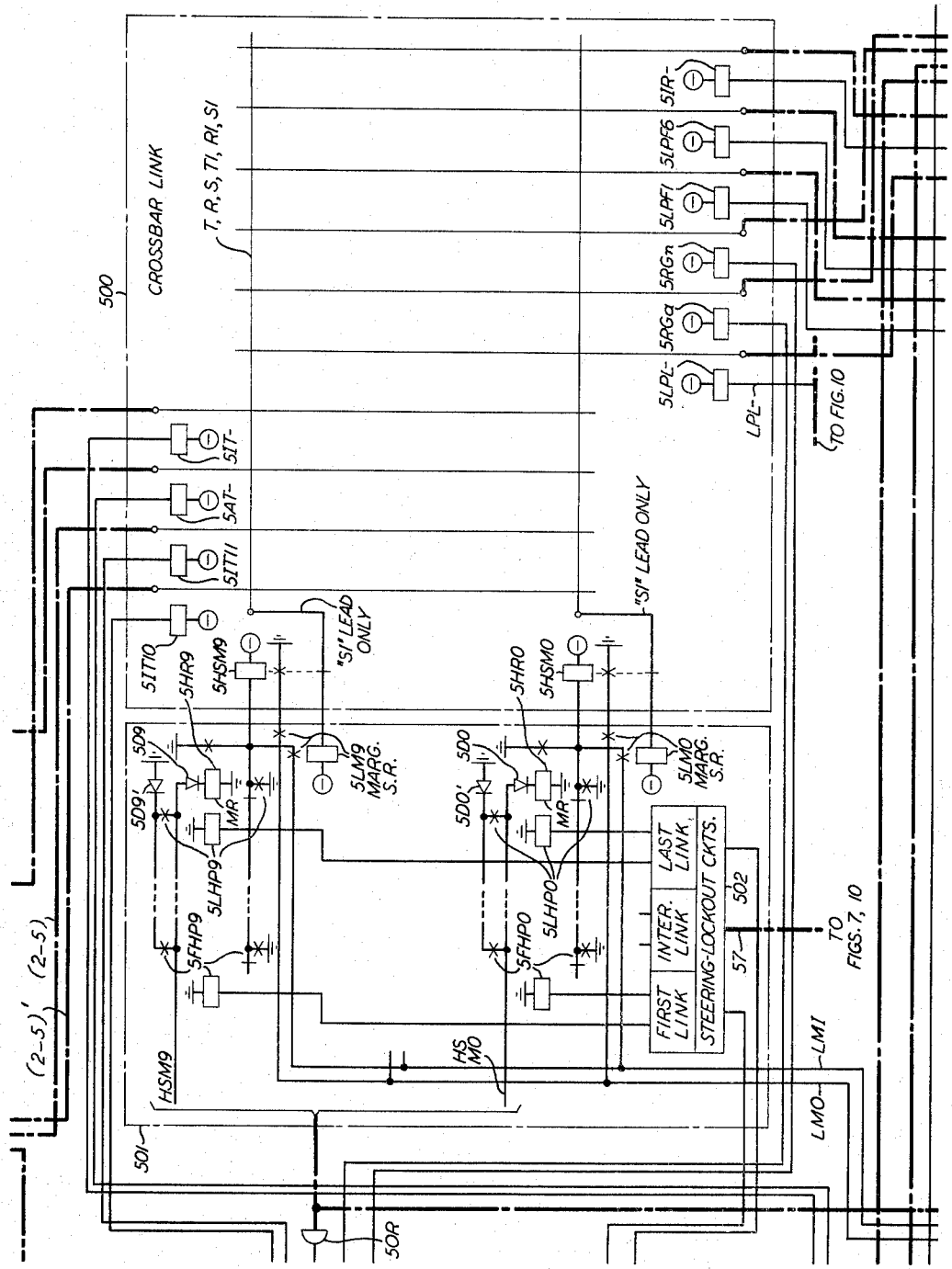
FIG. 5 shows the high-speed crossbar link.
Figure 7:
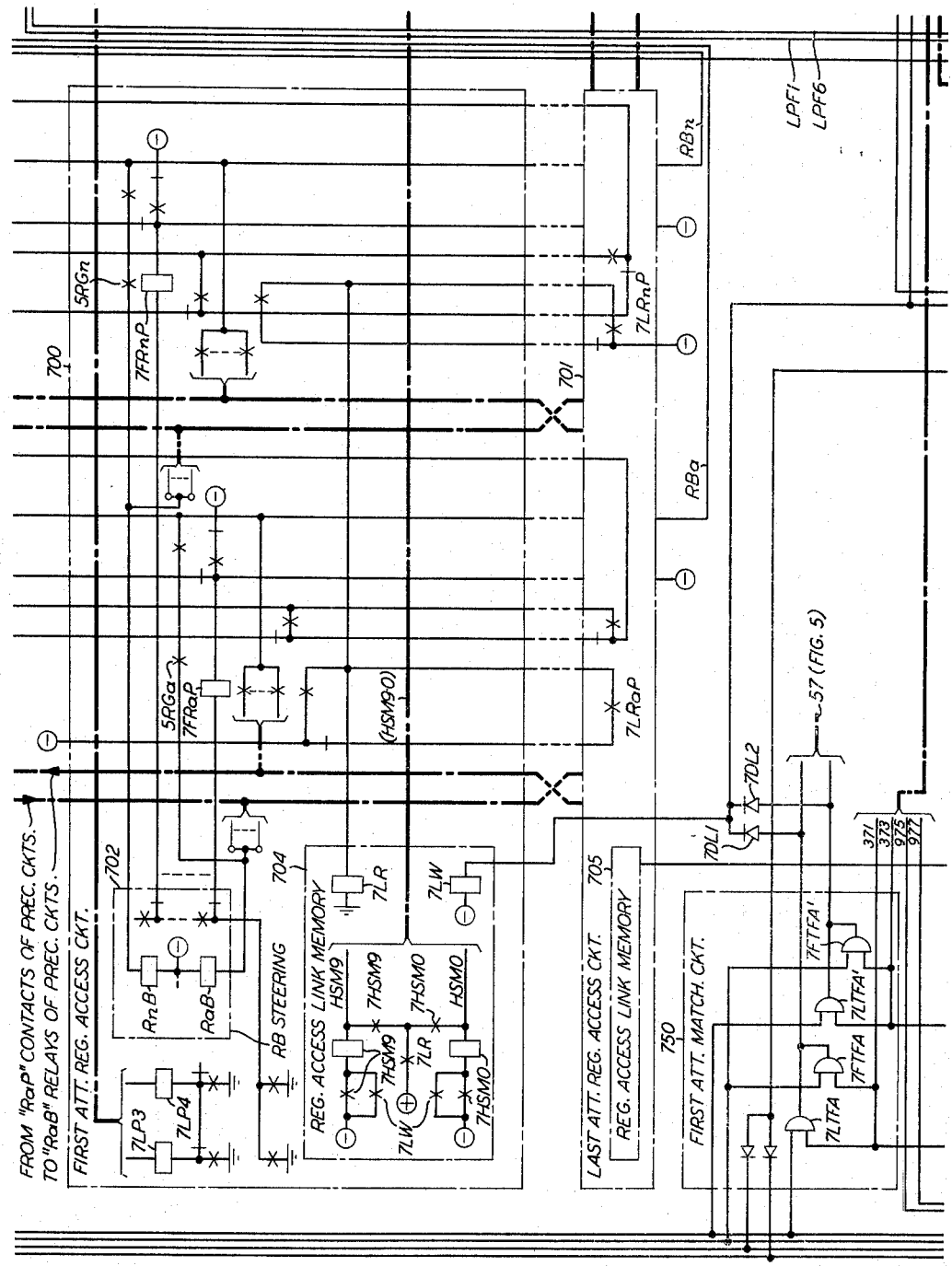
FIG. 7 shows the attendant register-access requesting circuits, one of the link path memory circuits and the attendant and trunk matching circuits.

Dial "0" trunk group 204 is associated with the trunk-register access and attendant loop access circuits intermediate to the "first" and "last" ones of these circiuts depicted in FIGS. 4, 7, and 10, and is associated as well with the high speed link circuit of FIG. 5 by means of cables corresponding to cables (2-4), (2-4)' and (2-5). the details of which circuits are not shown in the interest of avoiding unnecessary duplication in the drawing.

B. FIG. 3

Figure 3:
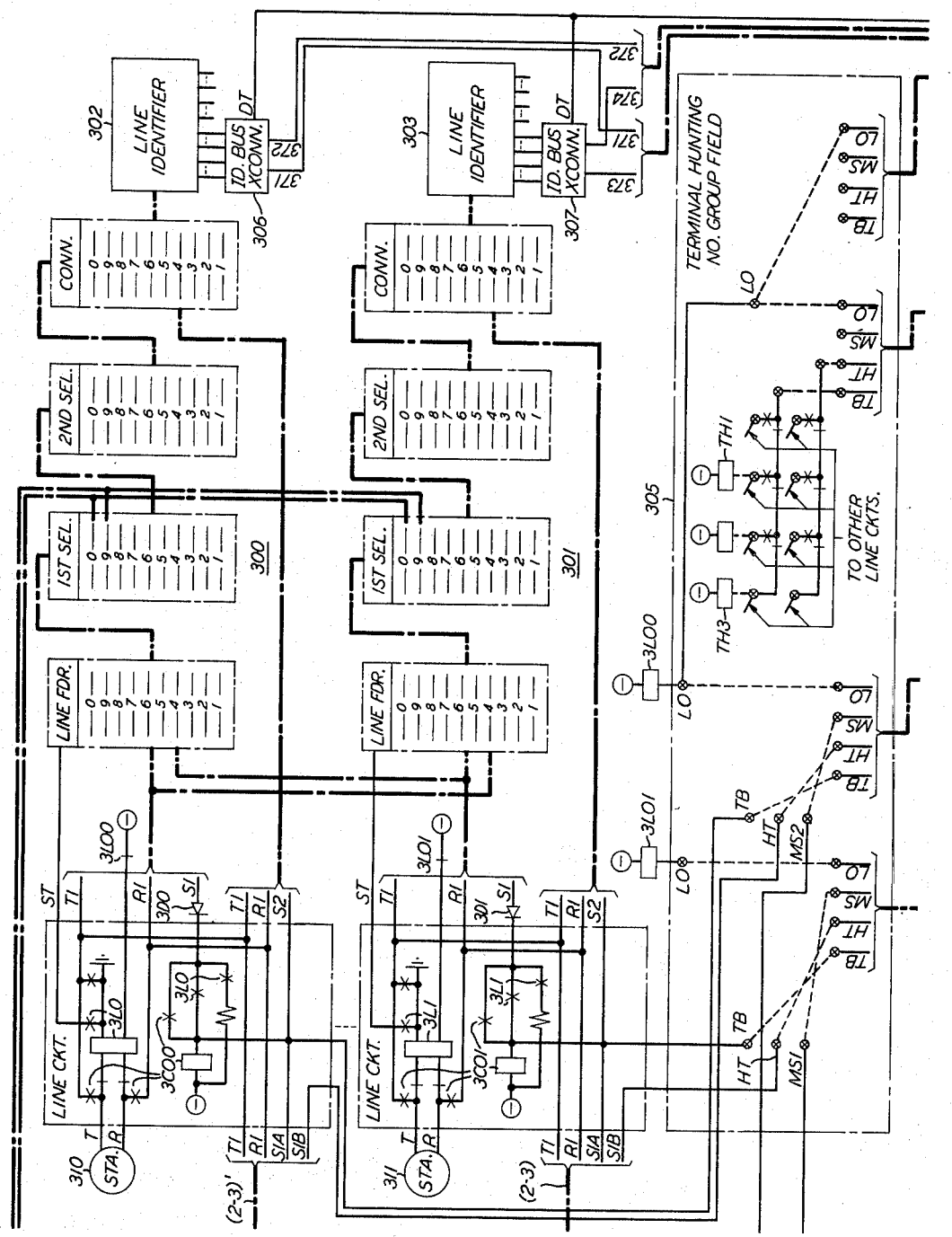
FIG. 3 shows the extension line circuits, the conventional switching system trains, the terminal hunting number group frame and the line identifiers.

FIG. 3 shows switching train systems 300 and 301 together with illustrative line circuits, extension station line identifiers and ID bus cross-connection circuits associated with each. The line circuit 3L0, 3L1 line relays and 3C0, 3C01 cut-off relays operate in their usual manner for calls of an intracommunicating nature. On calls incoming from a central office, however, the respective 3C0– relay is operated to extend the "T" and "R" leads of the extension station to the T1 and R1 leads of cable (2–3), (2–3)'. The operating path for the 3C01 relay, for example, extends from ground provided at the associated HT terminal of terminal hunting number group field 305, lead S1B, cable (2–3), make contact 2HF7, cable (2–3) to the winding of relay 3C01. Accordingly, an alternate operating path to that normally seen by relay 3C01 is provided by the register 900, 901, line group translator 600 and number group field 305 for this cut-off relay when the associated extension station is to receive a call from the central office. Diodes 3D0 and 3D1 are inserter in the line circuit S1 leads to block the positive identifying potential which may be applied over the S1A lead of cable (2–3), (2–3)', or over the TB lead of a line group translator, from being short-circuited by the ground which may be applied to the line circuit sleeve by the respective switching train system 300, 301 in its normal operation. Relays 3L01, 3L00 are operated by ground applied to the line circuit's respective L0 terminal in number group field 305 to prevent operation of the line circuit 3L0, 3L1 relay when the associated line circuit is seized by line group translator. In this manner, the line circuit ST lead cannot be grounded by the associated 3L0, 3L1 relay so that the extension user is prevented from originating a call at the same time that one is being routed to him from the central office.

Terminal hunting number group field 305 includes a plurality of terminal hunting relays TH1–TH3 associated with the line circuits of extension stations for which terminal hunting is desired. Thus, if the TB terminal of an extension station is grounded (line busy) at the time line group translator 600, 601 makes its connection, the TH1–TH3 relay advances the TB lead from the line group translator to the TB lead of the next desired line circuit (before the 9TB register relay operates), and so on, until a last idle or busy circuit is connected to the line group translator. Any desired type of terminal hunting arrangement may be employed in terminal hunting number group field 305, that indicated being merely by way of example. Numerous other hunting circuits are available and may be utilized among which is that shown in T. L. Dimond Patent 2,614,176. If the TH relays arranged as shown in FIG. 3 are used, they must be "fast operate" compared to the "slow operate" 9TB– relays of FIG. 9 so that an erroneous line busy indicator will not be given by the register before all the terminal hunting relays have had their opportunity to find an idle line.

C. FIG. 4

FIG. 4 shows the first and last incoming trunk-register access circuits 400–401. The dotted lines between the first and last of these access circuits indicate a plurality of intermediate trunk-register access circuits similar to the detail trunk-register access circuit 400. The intermediate access circuits are individually associated with corresponding groups of intermediate incoming and attendant, "dial 0" trunk circuits of FIG. 2. Accordingly, it is necessary only to describe the operation of the detailed trunk-register access circuit 400. Circuit 400 includes a plurality of 4TP– trunk preference relays only two of which are shown. In general, the number of 4TP– relays corresponds to the number of trunk circuits in the associated trunk group of FIG. 2. Relay 4TP10 is associated with the detailed trunk circuit of trunk group 201 by the E lead of cable (2–4). The E lead of cable (2–4) receives battery from the associated trunk circuit and when energized operates slow release relay 4TP10 provided none of the lower number 4TP– relay to the left of relay 4TP10 have been operated from their respective trunk circuits of trunk group 201. Relay 4TP10 operated locks to ground at its uppermost make contact and removes the ground operating path for relay 4TP11 and all higher number trunk preference relays.

Relay 4TP10 operated at its next lower make contact (all of the 4TP– relay contacts not otherwise numbered are shown in a vertical column immediately below the respective 4TP– relay winding) applies ground to RB steering circuit 402 over back contact 4AT. RB steering circuit 402, as is true of all of the other steering circuits of the several figures, advantageously may take the form of any well known type of steering circuit and the contacts and relays shown therein are not intended to be a complete rendition of all of their internal connections. Suffice it to say that the ground provided by the make contact of relay 4TP10 is continued over the back contact of the first one of busy steering relays R$a$B–R$n$B which is in the released condition to the winding of an associated register selection relay 4FR$a$P, 4FR$n$P. The one of the aforementioned register selection relays whose winding is grounded through steering circuit 402 will operate to battery provided over a chain circuit including the back contacts of the register selection relays for the same register in the other trunk-register access circuits and attendant-register access circuits. For example, relay 4FR$a$P will operate in access circuit 400 provided none of the corresponding "R$a$P" relays are operated in the intermediate through last trunk-register access circuit 401 of FIG. 4 and provided none of the attendant-register selection relays 7FR$a$P–7LR$a$P have been operated in the attendant-register access circuit 700, 701 of FIG. 7.

Relay 4FR$a$P operated locks to battery over the back contact 5RGA of the "$a$" registers (i.e., register 900, FIG. 9) vertical hold magnet of link 500 (FIG. 5). (Accordingly, the operated register selection 4FR$a$–7FR$a$, 4FR$n$–7FR$n$ relay of FIGS. 4 and 7 is released when the vertical hold magnet of its associated register is operated in link 500.)

Relay 4TP10 operated, in addition to operating a register selection relay, prepares an operating path (over its third set of contacts next below its winding) for the vertical 5IT– hold magnet of its associated trunk in link 500 and also disables the operating path for the vertical hold magnets of any of the lower numbered trunks of the associated trunk group.

The fourth set of contacts of relay 4TP10, when operated, connect the C lead of cable (2–4) to lead BL and the transfer contacts of relays 4FR$a$P–4FR$n$P. Assuming, as before, that relay 4FA$a$P is operated, the continuity of leads C and BL is extended over make contact of relay 4FR$a$P and the back contacts of the register selection 4FR$a$–7FR$a$ relays of the intermediate through last trunk-register access circuit and lead BL$a$ to the "$a$" register 900, FIG. 9.

The fifth set of contacts of relay 4TP10 next below its winding applies the positive or negative battery supplied by circuit 404 to one of its left-hand cross-connection terminals. When trunk-register access circuit 400 is seized by a trunk having a central office call to be connected to an extension station, negative battery is applied to the cross-connection terminals over back contact 4DT and when the trunk-register access circuit is seized by a trunk associated with a switchhook flashing extension station equipped for dial transfer positive battery is applied to the cross-connection over make contact 4DT. Relay 4PC is operated by the operated one of relays 4FR$a$P–4FR$n$P. The right-hand cross-connection terminals are connected over make contact 4PC and the transfer contact chain to the PC leads of the registers respectively associated with the RA–RN register selection relays.

The last set of contacts of relay 4TP10 when operated complete an operating path to the winding of relay 4AT over back contact 4DT and energize the H lead of cable (2–4). The "R$a$B" through "R$n$B" register busy relays of RB steering circuit 402 are operated by their respective registers 900, 901 (FIG. 9) over paths including make contacts of the associated "R$a$P"–"R$n$P" relays. Immediately upon selection, the register grounds of its one of the RBa–RBn leads to indicate its busy condition to the RB steering circuits of FIGS. 4 and 7. The RBa, RBn leads are chained through the contacts of the "RaP–RnP" selection relays of FIGS. 4 and 7: (1) so that the "RaB," "RnB" steering relay for the operated one of circuits 400–401, 700–701 is not immediately operated but is operated only upon the operation of the associated register's hold magnet 5RGa, 5RGn in the link 500; and (2) so that the "RaB," "RnB" steering relay for all the other circuits 400–401, 700–701 is operated immediately to prevent any of them from seizing the same register. Further descriptions of such steering circuitry may be found in the Bell Laboratories Record, March 1950, at p. 115.

D. FIG. 5

FIG. 5 shows the crossbar link 500, the link selection circuit 501 including link steering-lockout circuit 502 and the vertical hold magnet enabling gate 50R. A request for an idle link is made by battery applied over one of the LSa–LSn leads from FIG. 4 or from one of the leads of cable 57 (FIG. 7 and FIG. 10). The link steering-lockout circuits 502 are of the same general type as the preference, lock-out and steering circuits included in circuit 400 of FIG. 4 and function similarly to operate the first adjacent one of the associated link selection relays 5FHP0–5FHP9, and 5LHP0–5LHP9 found to be in the available condition. Accordingly, no more than one of the LSa–LSn leads nor more than one of the leads of cable 57 at a time is permitted to operate the associated link selection relay due to the action of the lock-out circuit portion of steering circuit 502.

Figure 8:
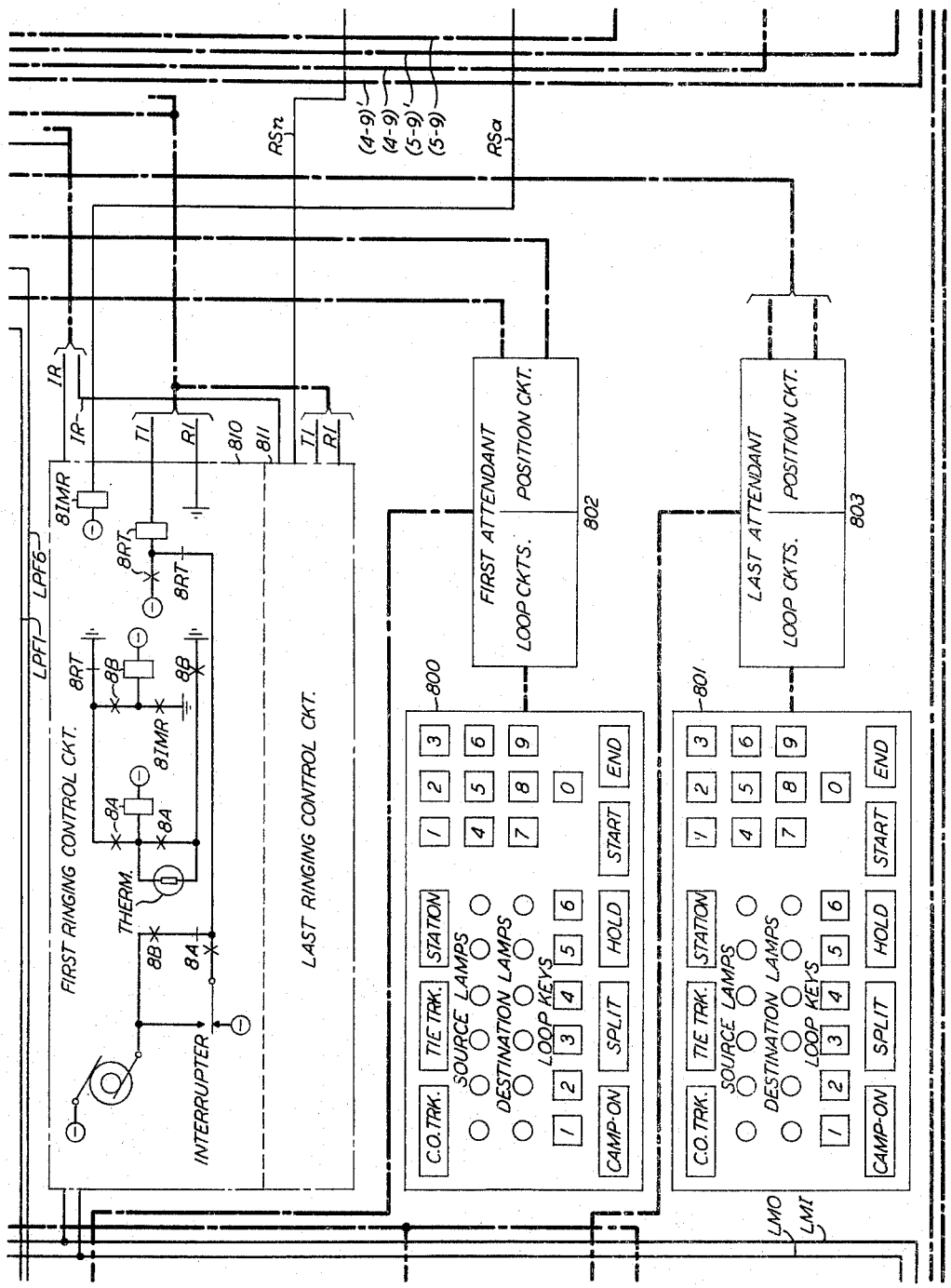
FIG. 8 shows the ringing apparatus, attendant consoles, and the loop and position circuits.

When one of the link selection relays is opearted, for example relay 5HP0, ground is returned to an HSM0–HSM9 input lead of vertical hold magnet enabling gate 50R such as lead HSM0 over the path ground, diode 5D0', and make contact 5FHP0. At the same time, the operated link selection relay at its transfer contact applies operating ground to the winding of the associated horizontal select magnet 5HSM– of link 500. The output (ground) of vertical hold magnet enabling gate 50R is returned to the winding of the appropriate vertical hold magnet which was selected by the associated one of the circuits of FIGS. 4, 8 or 10. Thus, for example, the vertical hold magnet 5IT10 for the incoming trunk circuit detailed in trunk group 201 is operated from the ground output of circuit 50R over a path completed by the third make contact of the 4TP10 relay of FIG. 4, and similarly, vertical hold magnet 5RGa is operated from the output of gate 50R over the path including the chain contacts of the "RaP" relays of FIGS. 4 and 7. Likewise any of the attendant loop vertical hold magnets 5LPF1, 5LPF6 or 5LPL– would be operated from the output of gate 50R over a path including the chained respective "10LPF–" contacts of circuit 1050 [or the corresponding chained 10LPL– contacts (not shown) of circuit 1051], (FIG. 10). Vertical hold magnets 5IR– are operated by similar vertical hold magnet selection relays of the ringing control circuits 810, 811 (FIG. 8).

While the output (ground) of gate 50R is the signal for enabling the associated link access requesting circuits of FIGS. 4, 7 and 10 to operate their respective vertical hold magnets in link 500, the slave contacts of the horizontal select magnet 5HSM– also may provide vertical hold magnet operating signals to circuits 810, 811, 1050, 1051. For example, when a register circuit (such as verifier 910), incident to its control of the end-marking switching trains of FIG. 2, determines that one of ringing circuits 810–811 should be connected to ring the called extension, it is not merely sufficient to use any idle horizontal path of circuit 500, but it is desirable to reuse the same horizontal path through circuit 500 that connects the vertical appearance of the calling trunk in circuit 500 with the vertical appearance of the seized register in circuit 500.

Similarly, when a register-translator such as 908 operates its 9RA (upon determining that the trunk should be connected to an attendant designated by one of leads 975–977) the horizontal link path connecting the trunk and the register is the ideal one to extend to the appropriate attendant loop. The register thereupon applies positive battery to the S1 lead of its vertical appearance in link 500 and this positive battery operates the associated marginal, slow-release link memory relay 5LM– over the back contact 5HSM–. (Relay 5HSM– was released incident to the initial operation of the trunk's and the register's vertical hold magnet.) Relay 5LM– operated prepares an operating path from circuits 810, 811 and 1050, 1051 to the winding of the associated 5HSM– magnet. When this path is grounded by any of circuits 810, 811 or 1050, 1051, the associated 5HSM– magnet operates and a ground is returned over the 5HSM– and 5LM– make contacts to the circuits 810, 811, 1050, 1051 to enable these circuits to operate the desired vertical hold magnets.

E. FIG. 6

Figure 6:
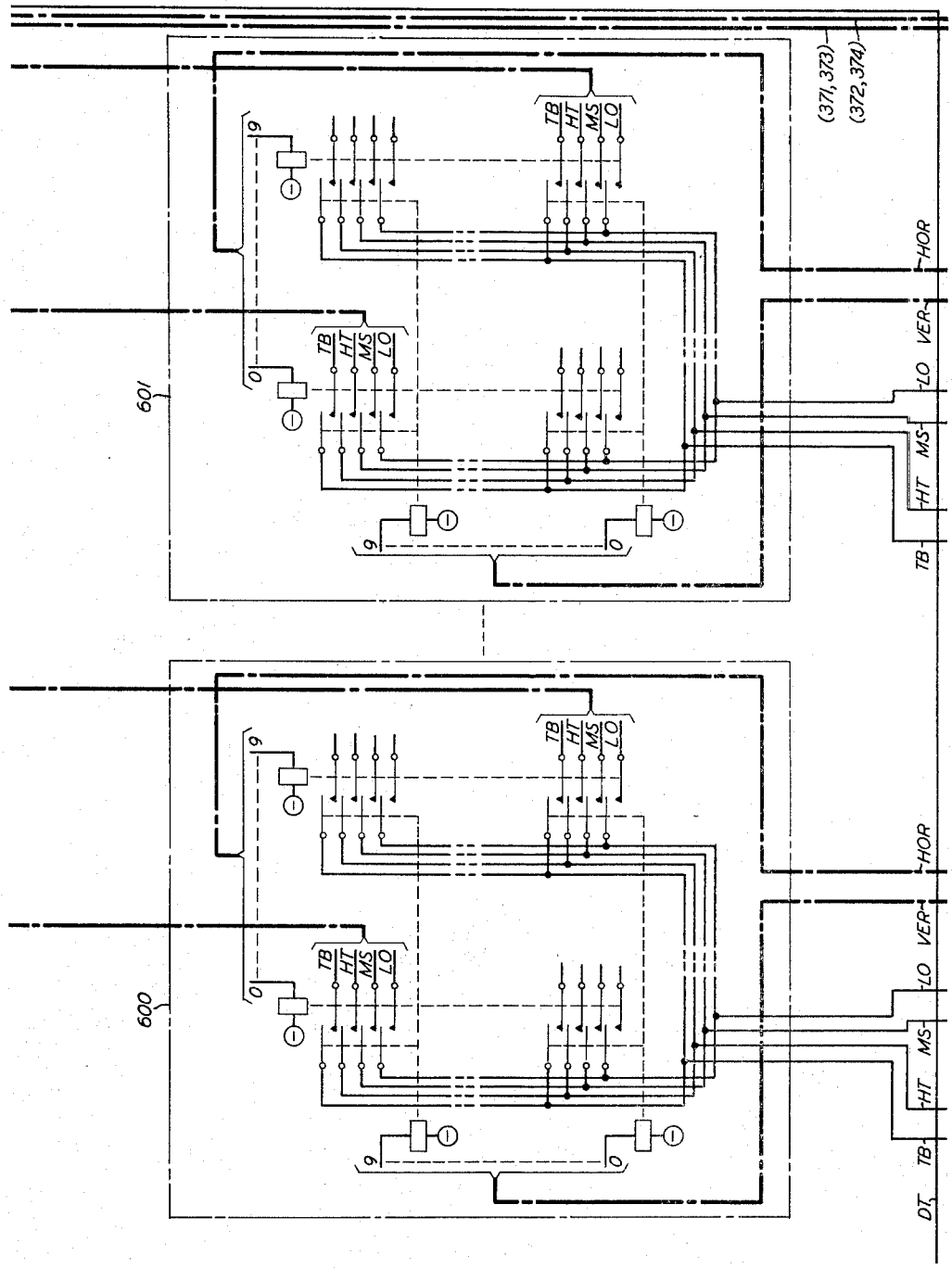
FIG. 6 shows the line group translators.

FIG. 6 shows two of the line group translators 600, 601, each of which, advantageously, may include a hundred crosspoints individually associated with one of a hundred corresponding line circuits of FIG. 3. The line group translator operation is straightforward and serves to extend the TB, HT, MS and LO leads from the associated line group translator connectors 902, 903 to any line circuit of FIG. 3 selected by the operation of one of the ten vertical magnets VER0–VER9 at the side of the array and one of the ten horizontal magnets HOR0–HOR9 at the top of the array. Additional details of the type of crossbar switch herein employed may be found in the above-mentioned F. M. Pearsall, Jr. Patent 2,889,402.

F. FIG. 7

FIG. 7 shows the attendant-register access circuit 700, 701 as well as the first attendant matching circuit 750 which is associated with the first attendant position idle loop access circuit 1050 of FIG. 10. Circuit 750 will, however, be considered in connection with the discussion of FIG. 10. Access circuit 700 includes a plurality of loop preference 7LP– relays that are operated similarly to the 4TP– relays of FIG. 4 except that the 7LP– relays are enabled when the associated attendant, having depressed a LOOP key at her console 800, 801 corresponding to the similarly numbered 7LP– relay also depresses the START key at her console. Operated LOOP and START keys initiate the request for access to an idle register 900, 901.

The idle register must be connected to the attendant loop via the same horizontal link path of circuit 500 that is in use to connect the attendant with the incoming trunk. The identity of the horizontal link path that is in use remains stored in register access link memory 704 after the path's horizontal magnet was released because memory write relay 7LW was operated either by matching circuit 750 or by access circuit 1050 and had conditioned the memory relays 7HSM0, 7HSM9 to respond to the grounding of their associated HSM0, HSM9 lead incident to the initial connecting of the attendant loop with the incoming trunk.

When a loop preference relay 7LP– operates, a ground operating path is steered through RB steering circuit 702 to operate an idle one of register selection relays 7FRaP–7FRnP. The operated one of these relays completes an operating path to link memory read-out relay 7LR at whose make contact positive battery is applied to the one of HSM0, HSM9 leads over the operated make contact of the associated 7HSM– link memory relay. The positive battery is applied to the winding of the associated 5HR– magnet relay of circuit 501. The operated 5HR– relay applies operating ground to the associated 5HSM magnet to reoperate the appropriate horizontal link.

G. FIG. 8

FIG. 8 shows the attendant consoles 800, 801 which may be located at any of the remote locations where the telephone sets belonging to the various PBX customers are located. The consoles 800, 801 are associated with the position circuits 802, 803, the latter being centrally located with the remaining apparatus of the multicustomer switching system. As disclosed in the above-mentioned patents 3,180,941 and 3,180,942, each console need include merely the source and destination lamps and the LOOP keys for six released loops together with a key pulsing set, a START key to summon a register and the usual camp-on, split and hold keys. The console is coupled to its associated circuit 802, 803 which circuits control the remainder of the switching system so that any console may associate its loop circuits with any of the incoming or attendant trunk circuits of FIG. 2. The central office trunk, tie trunk and station lamps may be illuminated over any convenient path associated with these respective sources by any well-known circuit and accordingly need not be hereinfurther described. The details of the loop and position circuits 802, 803 are shown in FIGS. 5 and 8 of the last above-mentioned copending applications.

FIG. 8 also shows much of the details of the ringing control circuits 810, 811 as is necessary to distinguish the functions therein carried out from the similar link access requesting and operating functions carried out in the previously-described circuit of FIGS. 4, 7 and 10. When one of registers 900, 901 determines that a ringing supply should be connected to ring an extension station, it grounds its associated ringing supply lead RSa, RSn, and operates an 8IMR relay of one of circuits 810, 811. When the register 900, for example, and its lead RSa are shown as being directly connected to a particular 8IMR relay, the same procedure as employed in FIGS. 4, 7 and 10 may be used to enable any of registers 900, 901 to operate any of the corresponding "8IMR" relays of circuits 810, 811. These details, therefore, are incorporated into circuits 810 and 811 by reference.

Relay 8IMR operated initiates a sequence of operation to reoperate the link whose identity is stored in one of the 5HR– relays of circuit 501 so that the T1 and R1 leads from circuit 810 may be connected over the reoperated horizontal link to the corresponding leads of the incoming trunk circuit. The reoperated link returns, via one of make contacts 5HSM–, a ground signal that is extended to a corresponding "IR" lead to the winding of the appropriate 5IR vertical hold magnet in link 500.

In addition to these operations, which are entirely similar to those performed by circuits 1050 and 1051, relay 8IMR operated, operates relay 8B. Relay 8B operated locks to ground over back contact 8RT and completes a path from the superimposed ringing supply over make contact 8B, back contact 8A, back contact 8RT and the winding of relay 8RT to the T1 lead thereby applying immediate ringing to the call line regardless of the state of the interrupter. Relay 8A is operated to ground by the thermistor over make contact 8B after a suitable delay. When relay 8A operates, it locks to ground over back contact 8RT and opens the circuit path short-circuiting the interrupter contacts so that normal ringing may be resumed. When the called station answers the D.-C. path completed between the T1 and R1 lead it operates ringing trip relay 8RT which releases relays 8B and 8A thereby restoring the circuit to normal.

H. FIG. 9

FIG. 9 shows the registers 900, 901 which may be used advantageously both to register the number of an extension station transmitted over an incoming trunk from central office 200 as well as to register the number of an extension station keyed by an attendant at one of consoles 800, 801. When seized by a central office of the step-by-step type, those switching pulses which may be transmitted before the T and R lead have been connected-through by link 500 are enabled to operate register relay 9A so that these signals are entered via the properly conditioned digit receiver into the correct states of digit register 906. Digit receiver 904 is conditioned to respond to the pulses transmitted over the T and R leads by the particular cross-connections to cable PCA that are selected by the trunk register access circuit 400. The TH, H, TN and U digits of the called number are entered in the respective W, X, Y and Z stages of digit register 906, of which the W and X stages (and the Y stage if necessary) are connected to operate register translator 908.

Register translator 908 selects the one of line group translator connectors 902, 903 corresponding to the called TH and H digits (if these digits are assigned to extension stations) or, if the particular digits in the W, X and Y stages are those of an attendant, the translator 908 selects the corresponding one of leads 975, 976. When all the digits of the called number have been registered in register 906, relay 9ST is operated and relay 9ST completes a path over back contact 9TB to the winding of slow operate relay 9HT and the winding of relay 9TMS. Relay 9HT will be operated provided relay 9TB is not operated by any ground potential caused to appear on the TB lead belonging to any called line in the busy condition. Busy intercept operation takes place if relay 9TB is operated and relay 9RT is operated (by cross connections to the code points internal to register translator 908 and not shown) so that an operating ground is completed to relay 9AS. Relay 9AS operated applies an identifying potential to the TB lead to cause the identifier 302, 303 associated with the called line to identify the appropriate attendant. In this manner the register serves to call in an attendant when the called station is busy.

On the other hand, if relay 9RT is not wired to a translator 908 code point so as to be operated by any particular organization's number registered in register 906, relay 9TB when it is operated transfers the ground from the ring lead R and winding of relay 9A to the a–c source of busy tone.

Of course, if relay 9TB is not operated, i.e., if the called line is idle, ground is completed over the 9TB back contact and the make contacts of relays 9HT and 9TMS to the HT, MS and LO leads of the called station's terminal appearance in terminal hunting number group field 305. As mentioned above, the terminal hunting relays TH1, TH3 associated with the TB and HT leads from register 900, 901 must be fast operate compared to the slower operate 9TB relays in the registers so that they will transfer the TB and HT leads to the line terminals of the new line before the 9TB relay operates to indicate that the first line was busy.

The relay 9RA is wired (by cross connections to the code points internal to translator 908, not shown) to be operated when the particular number that is entered in the digit register 906 is the listed directory number of a business organization. Relay 9RA operated at its make contact immediately applies positive battery to the S1 lead of the register's vertical appearance in link 500. As described above, the positive potential applied to the S1 lead causes the 5LM– relay associated with the horizontal link path connecting the calling trunk with the register to operate and thus store the identity of the link path so that it may be reoperated when the attendant loop appropriate to the registered digits has been selected by access circuits 1050, 1051.

I. FIG. 10

FIG. 10 shows the attendant position idle-loop access circuits 1050, 1051 and the last of the attendant matching circuits 750, 751, the first of which, matching circuit 750, is shown in FIG. 7 and will be described together with the operation of circuit 1050. Each access circuit 1050, 1051 includes a plurality of loop busy steering circuits which are essentially similar to the previously-described steering circuits 402, 702. The first two steering circuits, associated respectively with leads 371 and 373, are called into operation when an extension line identifier cross-connection circuit 306, 307 determines that an attendant is required either for call transfer or for busy intercept. The last two of the loop busy steering circuits, respectively associated with leads 975 and 977, are called into operation when the associated registers 900, 901 determine that a call is being made which requires the presence of the customer's telephone attendant.

When lead 371 is grounded by cross-connection circuit 306, the first loop busy steering circuit transfers the ground over one of transfer contacts 10LBF11, 10LBF16 to the winding of the first idle one of the associated loop selection relays 10LPF11, 10LPF16. When a loop selection relay is operated it locks out the other loop selection relays for the same attendant loop. These other loop selection relays are controlled by the second through fourth steering circuits of circuit 1050 in similar manner to that in which, for example, the register selection relays 4FRaP of FIG. 4 and 7FRaP of FIG. 7 were controlled. The operated loop selection relay completes an operating path to the winding of its associated vertical hold magnet in link 500 from the output of circuit 50R and also applies an enabling ground to the anode of one of the isolating diodes of matching circuit 750. The ground is conducted through the diode to operate the vertical hold magnet of the recalling trunk over operated contact 4AT in circuit 400. The output from circuit 50R, however, is provided only after an idle link has been selected in response to a bid obtained over cable 57 from matching circuit 750. The bid is initiated by matching the ground from the recalling trunk circuit with one of leads 371, 373. For example, a ground on lead 371 together with a ground from the circuit 400 enable AND gate 7FTFA to initiate a bid by grounding one of the leads of cable 57.

When an idle link has been selected by circuit 501, circuit 50R provides an output permitting the vertical hold magnet, both of the attendant loop circuits selected by circuit 1050 and all the recalling trunks, to be operated. Incident thereto, one of diodes 7DL1, 7DL2 is forward-biased by the ground from matching AND gate 7FTFA to operate link memory write relay 7LW so that link memory circuit 704 will store the identity of the assigned link in circuit 50R.

Leads 975 and 977, on the other hand, are associated with register translators 908 and 909, respectively, and are grounded with their respective register translators, determine that a call is being made which requires the attention of the first attendant. The attendant loop busy steering circuit transfers the ground from these leads to operate the first idle one of attendant loop selection relays 10LPF51–10LPF56 associated with lead 975 or 10LPF71–10LPF76 associated with lead 977. When one of leads 975, 977 is grounded, the operating ground provided to the one of the leads LPF1–LPF6 (over the operated one of the aforementioned 10LPF51, 10LPF56 or 10LPF71, 10LPF76 contacts) is not obtained from the output of circuit 50R, as in the case of a transfer or busy intercept call. Circuit 1050 extends ground over an operated one of the aforementioned contacts and diodes to ground lead LMI which operates relay 7LM in circuit 704 and which also reoperates the one of the 5HSM– relays in FIG. 5 that was preconditioned to be operated by one of registers 900, 901. The operated 5HSM– relay returns a ground over its make contact and that of the associated 5LM– relay to lead LMO. The ground on lead LMO is continued over one of the 10LPF51, 10LPF56 or 10LPF71–10LPF76 loop selection relays to ground the associated one of leads LPF1, LPF6 and thereby operate the vertical hold magnet for the desired loop.

Accordingly, it is seen that centralized multi-customer operation of a number of privately-switching extension station systems may be obtained by having a register-controlled, end-marking, inward-switching apparatus effect the communications connections between a number of common trunks and any of the extension stations of the different systems. Attendant apparatus, registers and ringing apparatus are selectively associated with the trunks and with each other via a link which is selectively enabled to reoperate any of the connection paths established therethrough. It is to be understood, however, that the above descriptive arrangements are merely illustrative of the principles of this invention and various other arrangements may be devised by those skilled in the art without departing from the spirit and scope of the invention.

What is claimed is:

1. A multicustomer private branch exchange comprising a plurality of trunks incoming to said exchange, a plurality of extension stations and attendants' position equipments, a group of said stations and one of said attendants' position equipments being individual to different telephone customers served by said exchange, a plurality of register circuits linkable to any of said incoming trunks, means controlled by said register circuits for recording the identity of the path by which a particular register is linked to a particular trunk, and means controlled by said register for extending the identified path from said trunk to said attendants' position equipments.

2. A multicustomer private branch exchange according to claim 1 wherein said attendants' position equipments include means for controlling over said identified path the connection of any said particular trunk with said extension stations.

3. A multicustomer private branch exchange comprising a plurality of common information-transmitting trunks incoming to said exchange, a plurality of attendants' positions each individual to a different telephone customer served by said exchange, a plurality of common register circuits, a link, means responsive to a calling condition at said trunks for establishing a path through said link between any calling one of said trunks and any of said registers, and means at said register responsive to information received over said incoming trunks for extending an established path through said link to said attendants' positions.

4. An inward-switching private branch exchange system comprising a plurality of extension stations, attendant loops, trunks and registers, link means, said trunks, said attendant loops and said registers each having appearances in said link means, translator means and attendant loop selection means selectively controlled by said registers responsive to the registration therein of numbers corresponding to said extension stations and attendant loops, said translator means being controlled to interconnect said registers with said extension stations and said attendant loop selection means being controlled by said registers through said link means to connect said trunks and said attendant loops.

5. An inward-switching private branch exchange system comprising a plurality of extension stations, trunks, registers, attendant loops and station line group translators, a link, said trunks, registers and attendant loops having respective appearances in said link, said link including a plurality of interconnecting paths assignable to combinations of said trunks, registers and attendant loops, switching means common to said trunks and to said extension stations, and means controlled by said station line group translators selected by any of said registers assigned one of said interconnecting paths in said link for selectively operating said switching means toc onnect said trunks with said stations and for operating said link means to connect said trunks with said attendant loops.

6. In a telephone switching system a plurality of customer groups of intracommunicating extension stations, a plurality of trunks, attendant loops individual to said customer groups of extension stations, means for connecting a calling one of said trunks with stations of any of said groups, means selectively controlled by said trunks for determining the busy or idle state of any of said extension stations independently of said connecting means, means for returning to said trunks supervisory indications of said state, means controlled by said determining means responsive to the busy state of any of said extension stations called by any said calling one of said trunks for identifying the customer group for said extension stations, and means responsive to the customer group identification provided by said identifying means for matching the one of said attendant loops corresponding to the identified one of said customer groups with said calling one of said trunks.

7. A connectorless branch telephone switching system comprising a plurality of PBX subscribers' lines and common trunks, a plurality of paired line finders and trunk finders, said lines being associated with said line finders and said trunks being associated with said trunk finders, means for marking a calling trunk and a called line, and means for controlling said lines, trunks and paired finders to establish a communications path to any of said lines through any of said paired finders from any calling one of said trunks.

8. A telephone switching system according to claim 7 wherein said controlling means includes trunk signaling means for ascertaining the condition of said lines prior to the establishing of any said communications path through said paired finders.

9. An inward-switching private branch exchange system comprising a plurality of extension stations, trunks, registers and attendant loops, link means, said trunks, registers and attendant loops having connectable appearances in said link means, means controlled by said registers for establishing connection paths between calling ones of said trunks and said extension stations, and means jointly controlled by said attendant loops and said trunks for operating said register means.

10. An inward-switching private branch exchange system according to claim 9 wherein said link means includes a plurality of link paths, said link paths being initially operable to interconnect any of said trunks and registers, and means controlled by said registers for reoperating an operated one of said link paths to interconnect any of said trunks with said attendant loops.

11. A multicustomer branch exchange comprising an intracommunicating switching system individual to each of a plurality of PBX telephone customers, each of said systems serving a plurality of extension lines, means for obtaining control access to the line terminals of any of said extension lines, a plurality of trunks common to said intracommunicating systems, and end-marking communications switching means jointly controlled by said control access obtaining means and any of said common trunks for establishing a communications path between a calling one of said trunks and said extension station lines.

12. A multicustomer branch exchange according to claim 11 wherein said control access means includes means for inhibiting the establishment of an intracommunicating connection by any of said intracommunicating switching systems.

13. A multicustomer branch exchange according to claim 12 wherein said control access means is connectable to any of said common trunks and includes means for signaling over a connected one of said trunks.

14. multicustomer branch exchange comprising a plurality of groups of extension station lines, a plurality of intracommunicating switching systems for establishing connections among any of said extension station lines within each of said groups, a plurality of trunks, registers and station line group translators, said translators being associated with said extension station lines to determine the condition thereof, means at said registers responsive to said condition of said extension stations, and means controlled by said registers for establishing communications connections between any of said trunks and said extension station lines.

15. A multicustomer private branch exchange comprising a plurality of extension-number-identified extensions; a plurality of attendant positions each to be associated only with predetermined groups of said extensions; a plurality of trunks incoming to said branch exchange for carrying telephone calls to any of said extensions; a plurality of extension number translating registers for translating any of said extension numbers; means for selectively interconnecting (a) said trunks and said attendant positions, (b) said trunks and said extension number translating registers, and (c) said attendant positions and said extension number translating registers; and means having only a control path established through an interconnection of said last-mentioned means for connecting said trunks and said extensions.

16. A private branch exchange comprising a plurality of extension number identifiable extensions; a plurality of common trunks, registers and ringing circuits; switching means for interconnecting any of said trunks and extensions; a plurality of attendant positions, said positions to be associated only with predetermined ones of said extensions; link access means; said trunks, registers, ringing circuits and attendant positions having appearances in said link access means; means controlled by said registers for marking connections to be established by said switching means; identifier means for obtaining the extension number of any of said extensions connected with one of said trunks; and means controlled by said identifier means for operating said link access means to connect said one of said trunks only with said predetermined ones of said attendants.

17. A telephone switching system comprising a central office, a plurality of trunk circuits, a branch exchange associated with said central office by said trunk circuits, means for providing PBX service to a plurality of telephone customers individually connectable with said central office over any of said trunk circuits, said PBX service providing means including: a plurality of attendant positions fewer in number than the number of said trunks but at least equal in number to the number of said different telephone customers for controlling call transfer between extensions associated with the same ones of said telephone customers, means controlled by each of said extensions when connected with said central office for connecting with one of said trunk circuits an attendant position associated with the same customer as that with which the respective one of said aforementioned each said extension is associated, means at said positions for initiating a calling connection between any of said last-mentioned and any of said other extensions, and means for immediately indicating at said belonging one of said attendant positions the state of any of the extension associated therewith before completing said calling connection thereto.

18. An inward-switching private branch exchange system comprising a plurality of extension stations, trunks and registers, ringing apparatus, link means, said trunks and said registers, attendant loops and ringing apparatus having appearances in said link means, communications path establishing means having termini associated with said trunks and said extension stations, means controlled by said registers for marking the calling trunk and the called station termini of said communication path establishing means, and means controlled by said registers independently of any said communications path for ascertaining the condition of said extension stations.

19. A multicustomer branch switching system comprising a plurality of trunks, attendant loops, and extension stations, a plurality of private branch switching systems individual to different telephone customers, each of said systems being associated with predetermined groups of said extension stations, means for establishing a communications connection between said trunks and any of said extension stations, means for applying an identifying potential over said communications connection to identify one of said attendant loops, and means for connecting said one of said loops to said trunks.

20. A multicustomer branch switching system comprising a plurality of trunks, extension stations and attendant loops, a plurality of private branch switching systems individual to different telephone customers, each of said systems being associated with predetermined groups of said extension stations, and means for establishing a communications connection between said trunks and any of said extension stations including: a crossbar link having horizontals and verticals, a plurality of registers, said trunks, attendant loops and registers appearing on the verticals of said crossbar link, means for selecting one of said registers, means for selecting one of said horizontals, means for operating said one of said horizontals to connect the vertical appearances of any of said trunks with the vertical appearance of said one of said registers, translator means controlled by said one of said registers, a plurality of back-to-back finder pairs, said trunks appearing in one and said lines appearing in the other finder of said pairs, and means controlled by said translator means for allotting one of said finder pairs to each said communications connection to be established.

21. A multicustomer branch switching system according to claim 20 wherein said link includes means for identifying operated ones of said horizontals and wherein said register selecting means includes means responsive to said identifying means for reoperating an identified one of said horizontals.

22. A multicustomer branch switching system according to claim 21 wherein the selected one of said registers includes means for operating said identifying means.

23. A multicustomer branch switching system according to claim 20 further comprising means for selecting one of said attendant loops, means at said link for identifying operated ones of said horizontals, and means at said loops selecting means responsive to said identifying means for reoperating one of said operated horizontals.

24. In a multicustomer branch switching system having a plurality of common trunks, extension stations and attendant loops, said extension stations and attendant loops being individual to different ones of said customers and further having intracommunicating switching branches associated with respective customers' groups of said stations, means for extending a communications path from any of said common trunks to said extensions and to said attendant loops comprising a crossbar link having horizontals and verticals, said horizontals being operable to connect at least two of said verticals, said trunks and said attendant loops appearing on said verticals, a link memory for preparing an auxiliary operating path for said horizontals, register means appearing on said verticals, said register means being selectively operable by said trunks to activate said link memory, and attendant loop selection means controlled by said register means to operate one of said horizontals over said auxiliary operating path.

25. A telephone switching system having a plurality of common trunks and private telephone stations, means for effecting connections among said stations belonging to the same private group, means associated with said trunks for extending trunk connections to said private stations, and means including said last-mentioned means for transferring a connection from one to another of said stations comprising means at said trunk circuit for detecting a transfer request from said one of said stations, means for applying an identifying potential over one of said trunk connections, private group indicating means associated with said stations and responsive to said identifying potential, matching means coupled to said transfer request detecting trunk circuit and to said private group indicating means, a plurality of registers and attendant loops, attendant loop selection means controlled by said matching means, and register selection means controlled by said attendant loops for reoperating said trunk connection extending means.

26. A telephone switching system according to claim 25 wherein said trunk connection extending means includes a plurality of paired trunk finders and line finders, and wherein said trunk finders include circuit means for applying said identifying potential.

References Cited by the Examiner
UNITED STATES PATENTS

| | | | |
|---|---|---|---|
| 2,220,423 | 11/40 | Nilsson | 179—18 |
| 2,354,660 | 8/44 | Bellamy | 179—22 |
| 2,490,036 | 12/44 | Beakin | 179—27 |
| 3,041,406 | 6/62 | Killian | 179—27 |

ROBERT H. ROSE, *Primary Examiner.*

WALTER L. LYNDE, *Examiner.*